US012587747B2

(12) United States Patent
Kaneko

(10) Patent No.: US 12,587,747 B2
(45) Date of Patent: Mar. 24, 2026

(54) APPARATUS, METHOD, AND STORAGE MEDIUM

(71) Applicant: CANON KABUSHIKI KAISHA, Tokyo (JP)

(72) Inventor: Seigo Kaneko, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

(21) Appl. No.: 18/545,310

(22) Filed: Dec. 19, 2023

(65) Prior Publication Data

US 2024/0214688 A1     Jun. 27, 2024

(30) Foreign Application Priority Data

Dec. 26, 2022     (JP) ................................. 2022-208053

(51) Int. Cl.
| | |
|---|---|
| *H04N 23/695* | (2023.01) |
| *H04N 23/58* | (2023.01) |
| *H04N 23/61* | (2023.01) |
| *H04N 23/62* | (2023.01) |
| *H04N 23/661* | (2023.01) |
| *H04N 23/67* | (2023.01) |

(52) U.S. Cl.
CPC ........... *H04N 23/695* (2023.01); *H04N 23/58* (2023.01); *H04N 23/61* (2023.01); *H04N 23/62* (2023.01); *H04N 23/661* (2023.01); *H04N 23/671* (2023.01)

(58) Field of Classification Search
CPC ...... H04N 23/695; H04N 23/58; H04N 23/61; H04N 23/62; H04N 23/661; H04N 23/671
See application file for complete search history.

(56) References Cited

U.S. PATENT DOCUMENTS

| | | | | |
|---|---|---|---|---|
| 2014/0218563 A1* | 8/2014 | Sugimoto | ............ | H04N 23/651 |
| | | | | 348/231.6 |
| 2016/0309093 A1* | 10/2016 | Ishii | ........................ | H04N 23/62 |
| 2019/0299861 A1* | 10/2019 | Weigert | ............... | B60Q 1/2661 |
| 2019/0349530 A1* | 11/2019 | Niga | .................... | H04N 23/631 |
| 2021/0067702 A1* | 3/2021 | Sato | ........................ | H04N 23/55 |

FOREIGN PATENT DOCUMENTS

JP           2017173802 A       9/2017

* cited by examiner

*Primary Examiner* — Christopher K Peterson
(74) *Attorney, Agent, or Firm* — Canon U.S.A., Inc. IP Division

(57) ABSTRACT

An apparatus includes an acquisition unit for acquiring a driving position of a capturing element which relates to tilt driving for changing a tilt angle formed between a surface of the capturing element and a main plane of an optical system by inclining the capturing element, a determination unit for determining whether the tilt angle exceeds a threshold based on the acquired driving position of the capturing element, and determining a user interface for operating a focus lens of the optical system based on a determination result.

19 Claims, 17 Drawing Sheets

Figure 5:
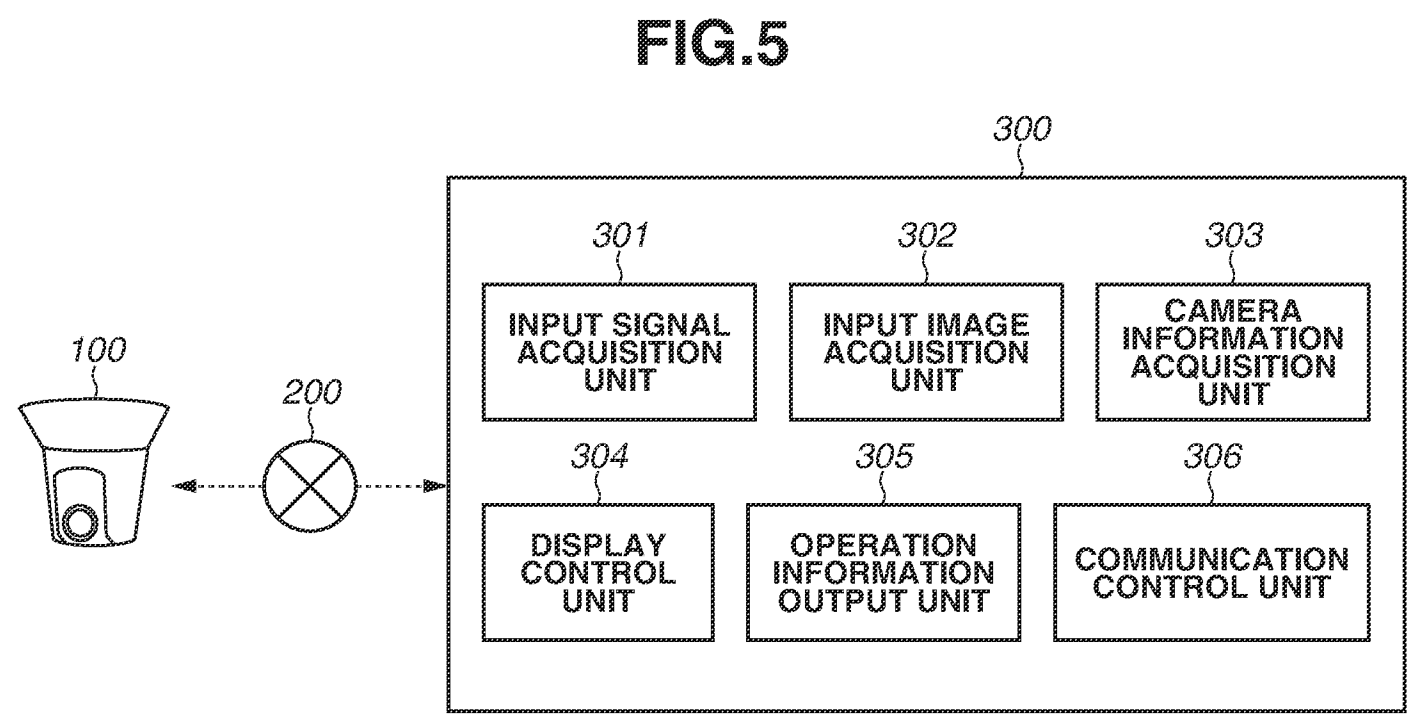

301 INPUT SIGNAL ACQUISITION UNIT

302 INPUT IMAGE ACQUISITION UNIT

303 CAMERA INFORMATION ACQUISITION UNIT

304 DISPLAY CONTROL UNIT

305 OPERATION INFORMATION OUTPUT UNIT

306 COMMUNICATION CONTROL UNIT

200

100

APPARATUS, METHOD, AND STORAGE MEDIUM

BACKGROUND

Technical Field

The aspect of the embodiments relates to an information processing apparatus, an information processing method, and a storage medium.

Description of the Related Art

Conventionally, an image capturing method (hereinafter, referred to as "tilt image capturing") has been known, which makes an imaging surface of an image capturing element (image sensor) be inclined with respect to a plane orthogonal to an optical axis of an image capturing optical system by inclining the image capturing element. In the tilt image capturing, a plane (focal plane) on which an object is brought into focus is inclined based on the Scheimpflug principle, so that a near view and a distant view can simultaneously be brought into focus.

According to a technique discussed in Japanese Patent Application Laid-Open No. 2017-173802, a focus deviation amount is detected from a plurality of focus detection areas on an image capturing screen (image capturing element), and a range of a depth of field is increased by adjusting an inclination angle (tilt angle) of the image capturing element based on the detected focus deviation amount.

However, according to the technique discussed in Japanese Patent Application Laid-Open No. 2017-173802, the user may not be able to intuitively operate the focus lens when the user tries to change a focal position depending on a degree of the tilt angle.

When tilt image capturing is not executed, a focal plane is shifted in a far-near (forward-backward) direction in tandem with driving of the focus lens. In contrast, when tilt image capturing is performed, the focal plane appears to shift vertically as the focus lens is driven.

As described above, since the shift direction of the focal plane changes due to the focus lens drive depending on the tilt angle, the user may operate the focus lens in a direction opposite to the shift direction of the focal plane the user has intended.

SUMMARY

According to an aspect of the embodiments, an apparatus includes at least one processor; and a memory coupled to the at least one processor storing instructions that, when executed by the at least one processor, cause the at least one processor to function as: an acquisition unit configured to acquire a driving position of a capturing element which relates to tilt driving for changing a tilt angle formed between a surface of the capturing element and a main plane of an optical system by inclining the capturing element, a determination unit configured to determine whether the tilt angle exceeds a threshold based on the acquired driving position of the capturing element, and configured to determine a user interface for operating a focus lens of the optical system based on a determination result.

Further features of the disclosure will become apparent from the following description of exemplary embodiments with reference to the attached drawings.

BRIEF DESCRIPTION OF THE DRAWINGS

FIG. 5 is a block diagram illustrating an example of a functional configuration of the client apparatus.

DESCRIPTION OF THE EMBODIMENTS

Hereinafter, exemplary embodiments embodying the disclosure will be described in detail with reference to the appended drawings.

The exemplary embodiments described below are merely examples for realizing the disclosure, and should be modified or changed as appropriate depending on a configuration and/or various conditions of an apparatus to which the disclosure is applied. Therefore, the disclosure is not limited to the exemplary embodiments described below.

System Configuration

Figure 1:
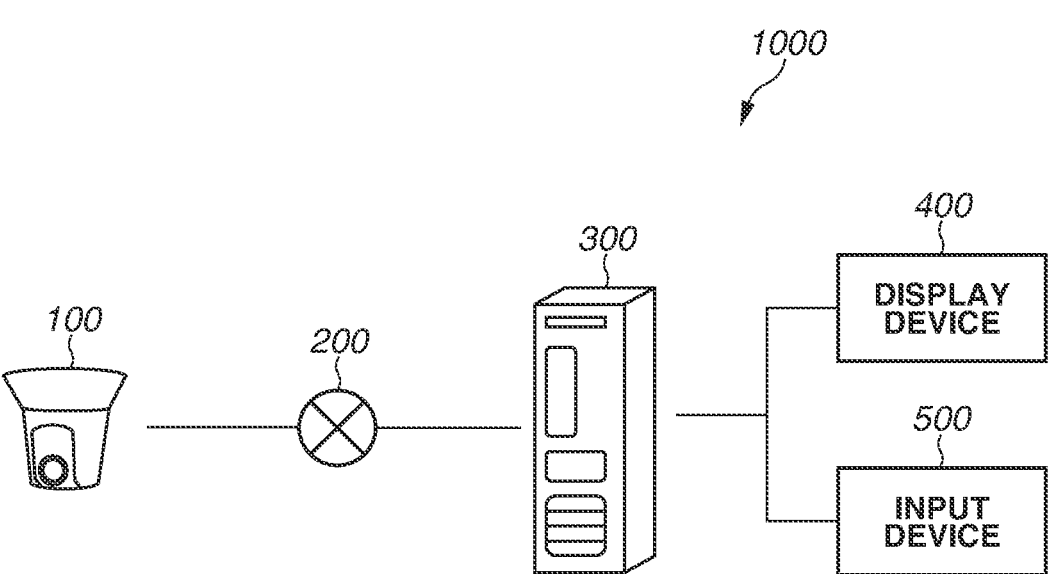
FIG. 1 is a diagram illustrating a configuration example of an image capturing system including an information processing apparatus according to a present exemplary embodiment.

FIG. 1 is a diagram illustrating a configuration example of an image capturing system 1000 which includes an information processing apparatus according to the present exemplary embodiment.

The image capturing system 1000 includes a network camera 100, a network 200, a client apparatus 300, a display device 400, and an input device 500.

For example, the network camera (hereinafter, simply referred to as "camera") 100 is an image capturing apparatus such as a monitoring camera. The camera 100 can communicate with the client apparatus 300 via the network 200. The camera 100 generates an image by capturing an object, and can transmit the captured image to the client apparatus 300 via the network 200.

The network 200 can be implemented by, for example, a router, a switch, and a cable, compliant with a communication standard such as the Ethernet®. The network 200 can also be implemented by the internet, a wired local area network (LAN), a wireless LAN, a wide area network (WAN), or a combination of these networks.

The display device 400 and the input device 500 are connected to the client apparatus 300. The display device 400 includes a display unit such as a display, and a captured image transmitted from the camera 100 can be displayed on the display device 400. The display device 400 can display a user interface (UI) for allowing the user to input operation information for operating the camera 100. The input device 500 includes input units such as a keyboard and a mouse, and the user uses the input device 500 in order to operate the client apparatus 300. The operations performed on the client apparatus 300 include a setting operation of image capturing conditions of the camera 100, an operation of a focus lens, and an operation of a tilt (inclination) of an image capturing element, via the network 200.

In the present exemplary embodiment, the client apparatus 300, the display device 400, and the input device 500 are provided as separate entities. However, the client apparatus 300, the display device 400, and the input device 500 can be integrated to constitute one body, such as a notebook personal computer (PC) having a touch panel display. The camera 100 and the client apparatus 300 do not always have to be connected to each other via the network 200. The camera 100 can directly be connected to the client apparatus 300. The camera 100, the client apparatus 300, the display device 400, and the input device 500 can also constitute an integrated body, such as a consumer camera having a touch panel display.

Configuration of Apparatus

Figure 2:
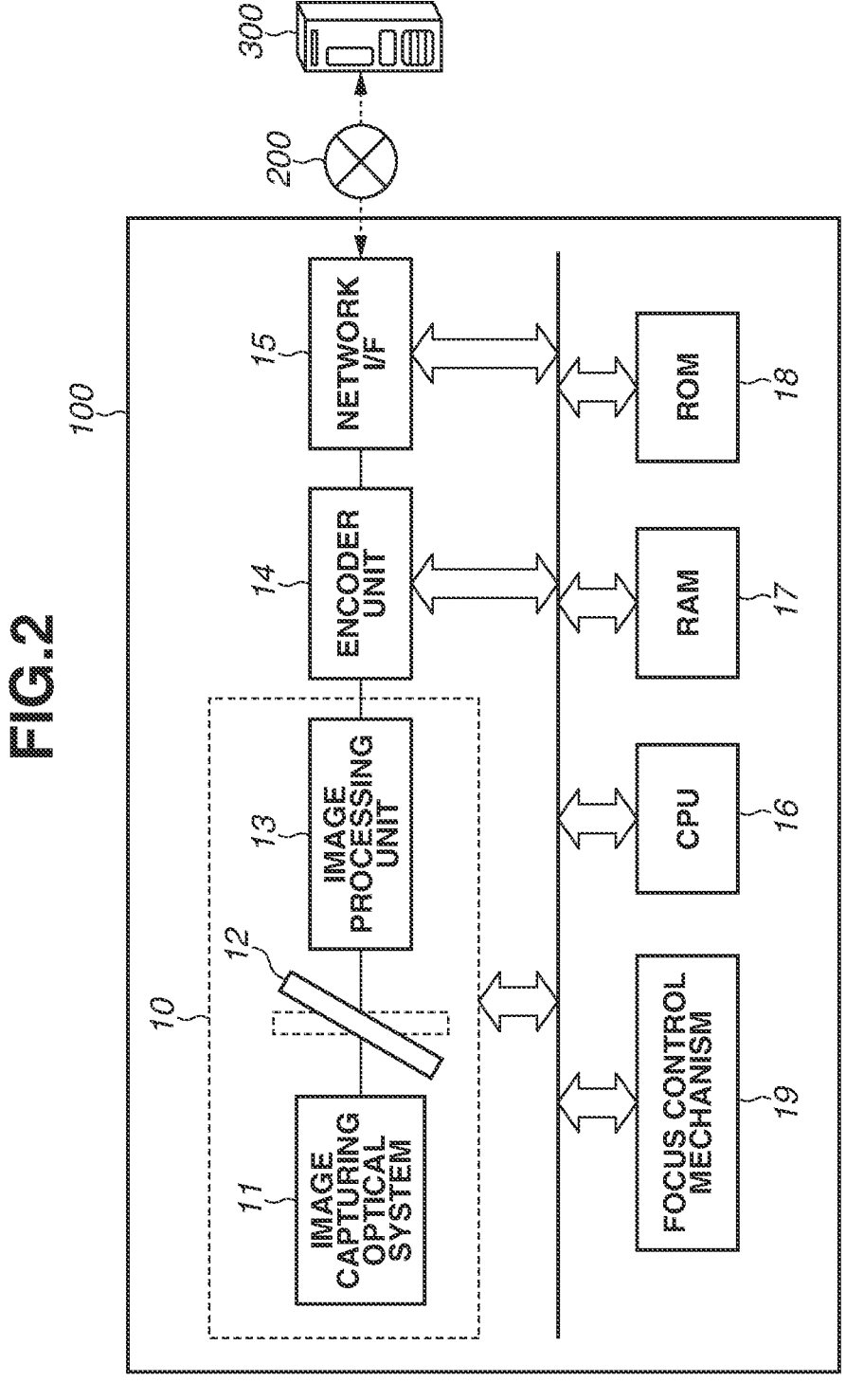
FIG. 2 is a block diagram illustrating a configuration example of an image capturing apparatus.

FIG. 2 is a diagram illustrating a configuration example of the camera 100.

The camera 100 includes an image capturing unit 10. The image capturing unit 10 includes an image capturing optical system 11, an image capturing element 12, and an image processing unit 13. The camera 100 further includes an encoder unit 14, a network interface (I/F) 15, a central processing unit (CPU) 16, a random access memory (RAM) 17, a read only memory (ROM) 18, and a focus control mechanism 19.

The image capturing unit 10 captures an object image through the image capturing optical system 11 and generates an image. The image capturing optical system 11 includes lenses which condense light from an object on an imaging surface of the image capturing element 12. The image capturing optical system 11 includes, for example, a zoom lens, a focus lens, and a camera-shake correction lens. The camera 100 may be an integrated camera with the image capturing optical system 11 built therein, or may be a lens interchangeable camera which includes an image capturing optical system 11 as a separate interchangeable entity. In a case where the image capturing optical system 11 is interchangeable, in one embodiment, the camera 100 acquires identification information or optical information of the image capturing optical system 11 by communicating with the image capturing optical system 11 at the time of connection.

The image capturing element 12 converts light from the object which is condensed on the imaging surface through the image capturing optical system 11 into electric signals, and outputs the electric signals for each of pixels. The image capturing element 12 is an integrated circuit (IC) chip on which pixels consisting of photoelectric conversion elements are arrayed in a matrix shape. The image capturing element 12 can be, for example, a charge coupled device (CCD) sensor or a complementary metal oxide semiconductor (CMOS) sensor. The image capturing element 12 has high sensitivity mainly to visible light. The image capturing element 12 has high sensitivity to any one of light of red (R), green (G), and blue (B) for each of the pixels, and also has a certain degree of sensitivity to infrared light. Thus, the image capturing element 12 can clearly capture an image of a bright object under a natural sunlight or illuminated by an infrared illumination.

The image capturing element 12 can also change an angle of tilt (inclination) by being rotationally driven by making an axis orthogonal to the optical axis of the image capturing optical system 11 as a rotation axis. At this time, an angle formed between the imaging surface of the image capturing element 12 and a main plane of the image capturing optical system 11 is referred to as "tilt angle". A state where the tilt angle is a threshold or less is referred to as a "non-tilt image capturing state", and a state where the tilt angle is more than the threshold is referred to as a "tilt image capturing state".

In the present exemplary embodiment, a tilt angle is driven to change by inclining the image capturing element 12. However, tilt driving for changing a tilt angle by inclining the image capturing optical system 11 with respect to the image capturing element 12 can also be implemented.

The image processing unit 13 executes analog-to-digital (A/D) conversion to convert electric signals output as analog signals from the image capturing element 12 into a digital signal, and generates a digital image by further executing image processing including de-mosaic processing, white balance processing, and gamma processing thereon. The image processing unit 13 corrects the brightness of image signals by amplifying or reducing digital values of the image signals output from pixels or pixel groups for each of the pixels or each of the pixel groups.

The encoder unit 14 executes encoding processing on the image data output from the image capturing unit 10 according to a predetermined file format, such as Motion JPEG, H264, or H265.

The network I/F 15 is an interface used for communicating with the client apparatus 300 via the network 200. Image data encoded by the encoder unit 14 through the encoding processing is transmitted to the client apparatus 300 from the network I/F 15 via the network 200. The image data encoded through the encoding processing can be stored in an internal storage device such as the RAM 17 or the ROM 18 or a removable storage medium (not illustrated) such as a secure digital (SD) card. Image data can also be stored after the image data is output from the image processing unit 13.

In this case, RAW data before encoding is saved as the image data.

The CPU 16 is a central processing device which generally controls the camera 100.

The RAM 17 can temporarily stores a computer program executed by the CPU 16. The RAM 17 can provide a work area used when the CPU 16 executes processing. The RAM 17 can also function as a frame memory or a buffer memory.

The ROM 18 stores programs which the CPU 16 executes in order to control the camera 100.

The focus control mechanism 19 is a driving mechanism for focus controlling based on the user operation. In the present exemplary embodiment, the focus control refers to control of a focus lens and a tilt angle. The user can control the focus not only by a manual operation but also by automatic control like an autofocus (AF).

The focus control mechanism 19 includes motors and gears for moving the focus lens or inclining the imaging surface of the image capturing element 12 with respect to a plane orthogonal to an optical axis of the image capturing optical system 11.

Figure 3:
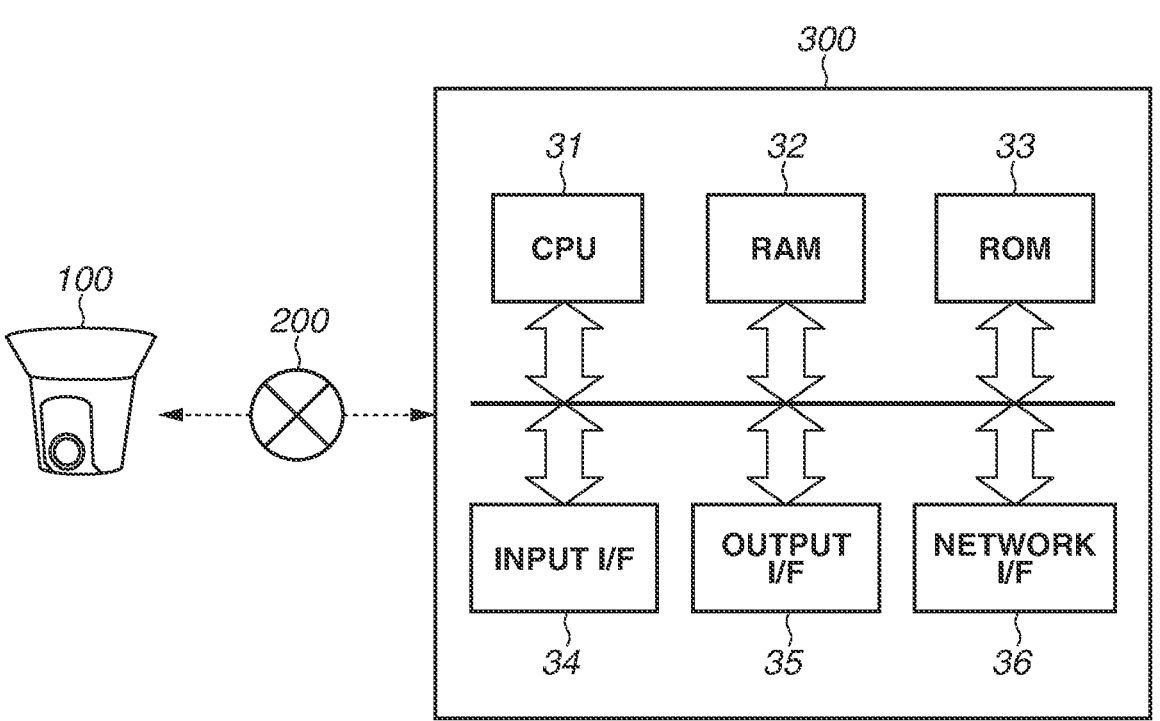
FIG. 3 is a block diagram illustrating a configuration example of a client apparatus.

FIG. 3 is a block diagram illustrating a configuration example of the client apparatus 300.

The client apparatus 300 includes a CPU 31, a RAM 32, a ROM 33, an input I/F 34, an output I/F 35, and a network I/F 36.

The CPU 31 is a central processing device which generally controls the client apparatus 300.

The RAM 32 can temporarily stores computer programs executed by the CPU 31. The RAM 32 can provide a work area used when the CPU 31 executes processing.

The ROM 33 stores programs which the CPU 31 executes in order to control the client apparatus 300.

The input I/F 34 is connected to the input device 500, and functions as an interface for accepting an operation with respect to the client apparatus 300 which the user has input via the input device 500.

The output I/F 35 is connected to the display device 400, and functions as an interface for displaying an image output from the camera 100 on the display device 400.

The network I/F 36 is connected to the camera 100 via the network 200, and functions as an interface for inputting operation information to the camera 100 and receiving an image output from the camera 100.

Functional Configuration

Figure 4:
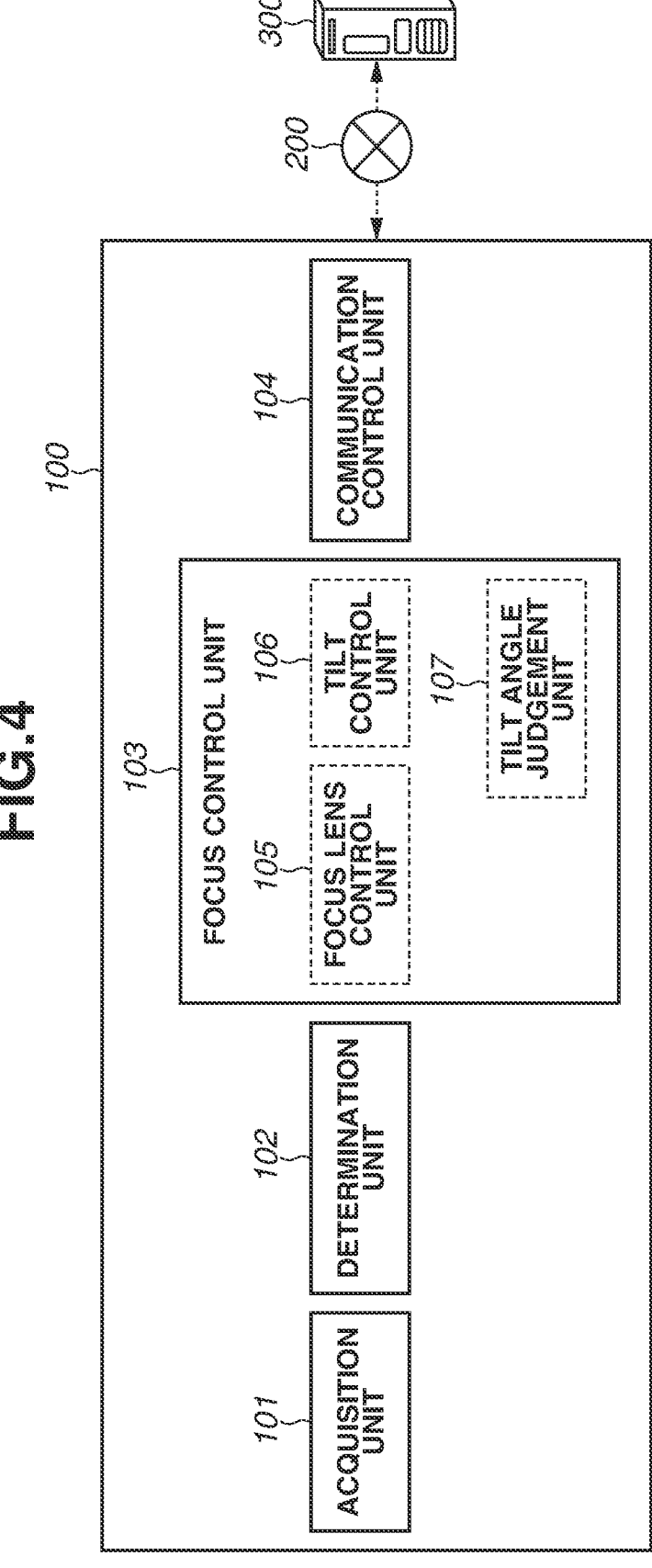
FIG. 4 is a block diagram illustrating an example of a functional configuration of the image capturing apparatus.

FIG. 4 is a block diagram illustrating an example of a functional configuration of the camera 100.

The CPU 16 executes a program stored in a memory such as the ROM 18 to implement all or part of the functions of the camera 100 illustrated in FIG. 4. However, at least part of the functions of the camera 100 may be operated as dedicated hardware. In this case, the dedicated hardware is operated based on the control executed by the CPU 16.

In a case where a function is to be implemented by hardware, for example, a dedicated circuit can automatically be generated on a Field Programmable Gate Array (FPGA) through a program for implementing the function of each functional block by using a predetermined compiler. As with the case of the FPGA, the function can also be implemented by hardware by forming a gate array circuit. Alternatively, the function can be implemented by an application specific integrated circuit (ASIC).

The configuration illustrated in FIG. 4 is merely one example, and a plurality of functional blocks ca constitute a single functional block, or any one of the functional blocks can be divided into functional blocks for executing a plurality of functions.

The camera 100 includes an acquisition unit 101, a determination unit 102, a focus control unit 103, and a communication control unit 104.

The acquisition unit 101 acquires image data captured by the image capturing unit 10 illustrated in FIG. 2 and operation information received from the client apparatus 300 via the network 200. For example, the operation information received from the client apparatus 300 is operation information relating to the focus lens and the tilt angle of the camera 100.

Based on the operation information acquired by the acquisition unit 101, the determination unit 102 determines a driving position of the focus lens and a driving position of the image capturing element 12. The determination unit 102 also determines a UI to be displayed on the display device 400 based on whether the tilt angle exceeds a threshold.

The focus control unit 103 respectively drives motors (not illustrated) included in the focus control mechanism 19 illustrated in FIG. 2 to shift the focus lens and the image capturing element 12 to the driving positions of the focus lens and the image capturing element 12 determined by the determination unit 102. The focus lens and the image capturing element 12 can respectively be driven by independent motors.

The focus control unit 103 includes a focus lens control unit 105, a tilt control unit 106, and a tilt angle judgement unit 107.

The focus lens control unit 105 drives the focus lens in an optical axis direction by rotating a motor for driving the focus lens included in the focus control mechanism 19.

The tilt control unit 106 rotates a tilt driving motor included in the focus control mechanism 19 to drive the image capturing element 12 in a predetermined rotation direction by making an axis orthogonal to an optical axis as a rotation axis.

The tilt angle judgement unit 107 judges whether a tilt angle exceeds a threshold, i.e., whether tilt image capturing is being executed. The determination unit 102 determines a UI to be displayed on the display device 400 based on this judgement result. The camera 100 can transmit UI information (including an image) according to the judgement result acquired by the tilt angle judgement unit 107 to the client apparatus 300.

The communication control unit 104 generally controls transmission and reception between the camera 100 and the client apparatus 300 via the network 200. The communication control unit 104 controls transmission of image data acquired by the acquisition unit 101 and the UI information determined based on the judgement result acquired by the tilt angle judgement unit 107, with respect to the client apparatus 300.

In addition, all or part of the functions of the camera 100 illustrated in FIG. 4 may be implemented as the functions of the client apparatus 300.

FIG. 5 is a diagram illustrating an example of a functional configuration of the client apparatus 300.

The CPU 31 executes a program stored in a memory, such as the ROM 33, to implement all or part of the functions of the client apparatus 300 illustrated in FIG. 5. However, at least part of the functions of the client apparatus 300 may be operated as dedicated hardware.

In this case, the dedicated hardware is operated based on the control executed by the CPU 31.

In a case where a function is to be implemented by hardware, for example, a dedicated circuit may automatically be generated on an FPGA through a program for implementing the function of each functional block by using a predetermined compiler. As with the case of the FPGA, the function may also be implemented by hardware by forming a gate array circuit. Alternatively, the function may be implemented by an application specific integrated circuit (ASIC).

In addition, a configuration illustrated in FIG. 5 is merely one example, and a plurality of functional blocks may constitute a single functional block, or any one of the functional blocks may be separated into a plurality of functional blocks.

The client apparatus 300 includes an input signal acquisition unit 301, an input image acquisition unit 302, a camera information acquisition unit 303, a display control unit 304, an operation information output unit 305, and a communication control unit 306.

The input signal acquisition unit 301 accepts an input from the user via the input device 500.

The input image acquisition unit 302 acquires UI information and UI images received from the camera 100 via the network 200.

The camera information acquisition unit 303 acquires camera information via the network 200. The camera information is used when the camera 100 captures an object. The camera information includes various types of camera setting information and image processing information used when the camera 100 captures an object and acquires an image thereof. Specifically, the camera information includes exposure parameters (camera setting information relating to exposure), such as aperture, shutter speed, and gain, and information about image processing relating to luminance, such as gamma correction, edge enhancement, and white balance. The camera information also includes a position of the focus lens of the camera 100 and the tilt angle of the image capturing element 12 of the camera 100.

The display control unit 304 executes display control to display an image acquired from the camera 100 on the display device 400 according to instructions from the CPU 31. An image including a UI determined by the camera 100 is displayed on the display device 400.

Although the present exemplary embodiment is described with respect to the case where the camera 100 determines a UI depending on the tilt angle, the display control unit 304 may determine a UI depending on the tilt angle. In this case, the display control unit 304 judges whether the tilt angle exceeds a threshold, based on the camera information acquired by the camera information acquisition unit 303, and determines a UI based on the judgement result.

The operation information output unit 305 outputs operation information for the camera 100 input by the user that has been acquired by the input signal acquisition unit 301. For example, the operation information output unit 305 outputs an operation of the focus lens and an operation of the tilt angle of the camera 100 to the camera 100 via the network 200.

The communication control unit 306 generally controls transmission and reception executed by the camera 100 and the client apparatus 300 via the network 200.

In a case where the camera 100 and the client apparatus 300 constitute an integrated body such as a consumer camera, such a functional configuration includes all or part of the functions of the camera 100 and the client apparatus 300.

Descriptions of Operations

A shift of a focal plane executed in tandem with driving of the focus lens is described below.

Figure 6:
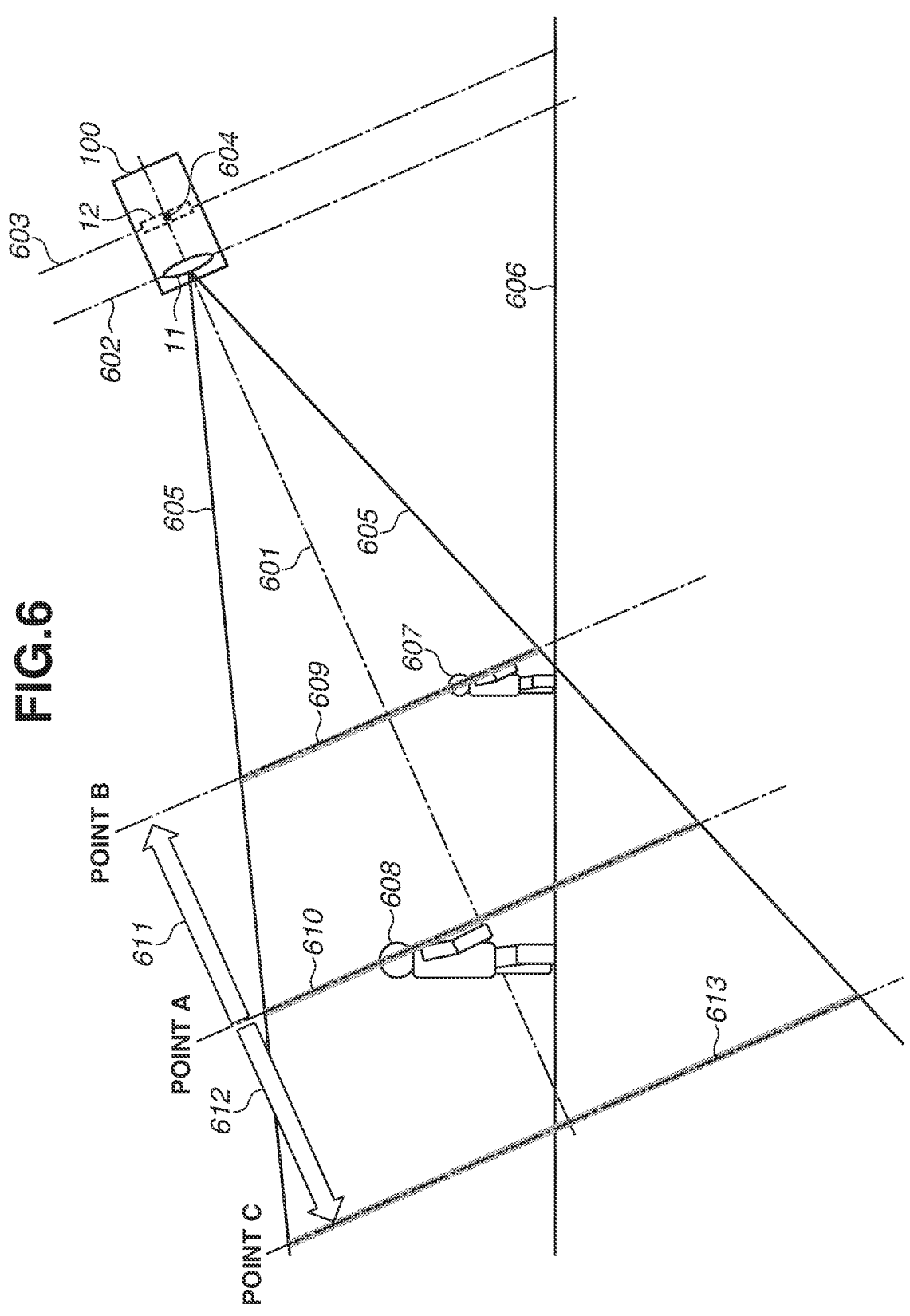
FIG. 6 is a diagram illustrating a side view of the image capturing apparatus in a non-tilt image capturing state.

FIG. 6 is a diagram illustrating a side view of the camera 100 without a tilt angle (e.g., in a non-tilt image capturing state).

In FIG. 6, the camera 100 is installed at a high place, such as a ceiling, and captures an image from a higher perspective. In order to clearly describe the tilt angle, the image capturing optical system 11, the image capturing element 12, and a tilt axis 604 as a tilt-driving rotation axis of the image capturing element 12 are illustrated in the camera 100 in FIG. 6. In order to provide a clear drawing, the camera 100 is expressed by a simple rectangle.

The image capturing optical system 11 is illustrated as a single complex lens in which a plurality of lenses is combined for the sake of clear description. The image capturing optical system 11 is arranged to be perpendicular to the optical axis 601. A lens main plane 602 in the above-described state is indicated by a dotted line. The image capturing element 12 does not have a tilt angle and is arranged to be perpendicular to the optical axis 601. An imaging plane 603 of the image capturing element 12 is indicated by a dotted line.

The optical axis 601 is a center of the optical axis of the camera 100. In FIG. 6, the lens main plane 602 and the imaging plane 603 are parallel to each other and do not intersect with each other.

An image capturing range 605 expresses a range the camera 100 can capture images.

In FIG. 6, the camera 100 captures a near-view object 607 and a distant-view object 608 on the ground 606. The present exemplary embodiment is described with respect to a case where the near-view object 607 is lower than the distant-view object 608.

A near-view focal plane 609 is a focal plane where the near-view object 607 is in focus. A distant-view focal plane 610 is a focal plane where the distant-view object 608 is in focus. The focal plane is changed depending on a driving position of the focus lens.

When a focal position is moved to a point B from a point A, a focal plane is shifted to the focal plane 609 (e.g., a near-view side) from the focal plane 610. When a focal position is moved to a point C from the point A, a focal plane is shifted to a focal plane 613 (e.g., a distant-view side) from the focal plane 610.

In the present exemplary embodiment, a rotation direction of the motor for driving the focus lens when a focal position is moved to the point B from the point A is a forward direction (clockwise direction), and a rotation direction of the motor for driving the focus lens when a focal position is moved to the point C from the point A is a backward direction (counterclockwise direction).

In order to provide clear descriptions, the present exemplary embodiment is described while paying attention on a focal plane where an object is in focus the most, and descriptions of an in-focus range (e.g., a depth of field) are omitted.

Figure 7:
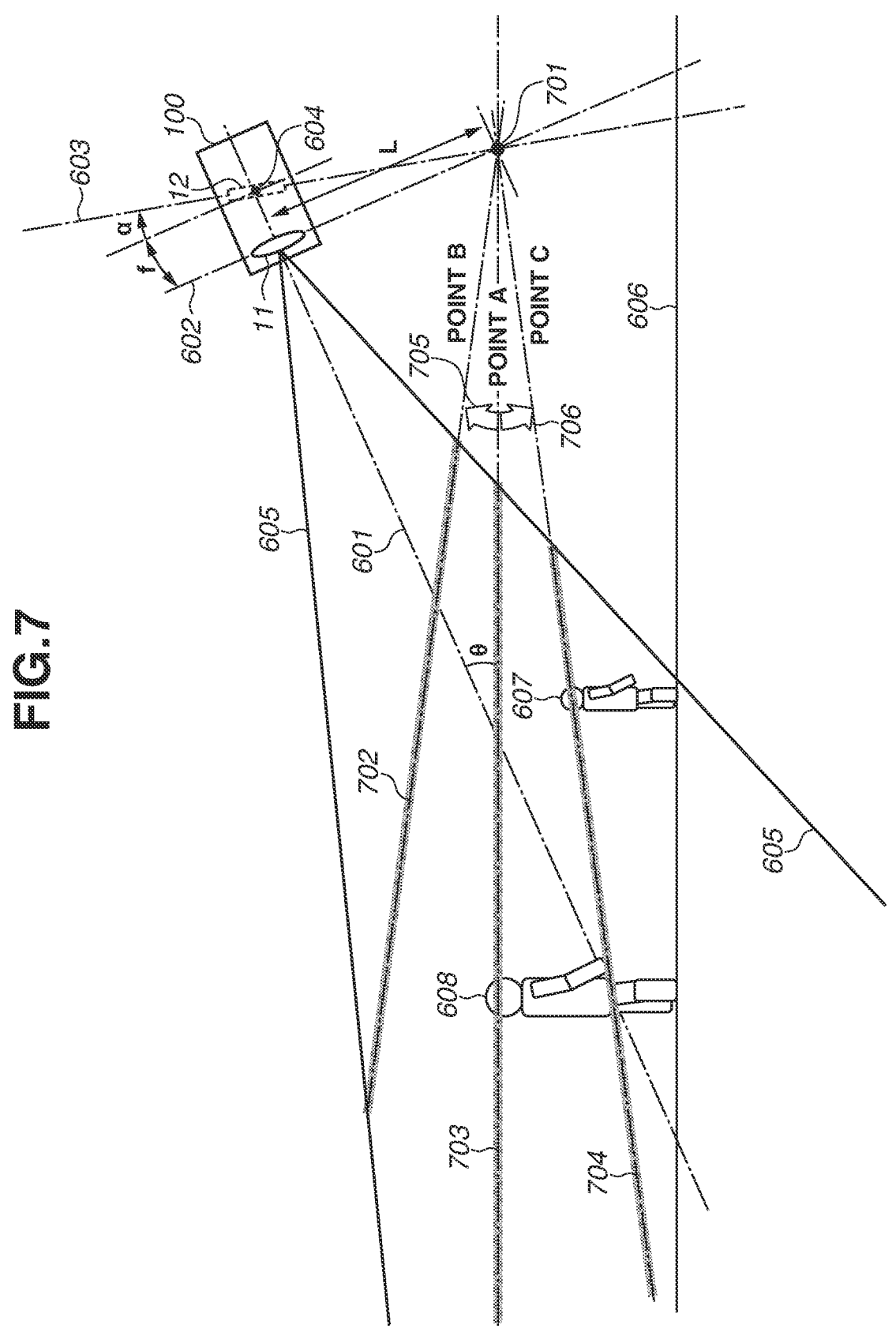
FIG. 7 is a diagram illustrating a side view of the image capturing apparatus in a tilt image capturing state.

FIG. 7 is a diagram illustrating a side view of the camera 100 having a tilt angle (e.g., in a tilt image capturing state).

In FIG. 7, the image capturing element 12 is inclined from the state illustrated in FIG. 6. Descriptions overlapping with descriptions in FIG. 6 are omitted. From the state illustrated in FIG. 6, the image capturing element 12 in FIG. 7 is rotated by a tilt angle α in a clockwise direction in FIG. 7 by making a tilt axis 604 as a rotation axis. At this time, the imaging plane 603 is inclined with respect to the optical axis 601, so that the lens main plane 602 and the imaging plane 603 intersect with each other at an intersection point 701. This intersection point 701 is a Scheimpflug intersection point, and the focal plane intersects with the intersection point 701 based on the Scheimpflug principle. In other words, the focal plane is rotated by making the intersection point 701 as a rotation axis depending on a driving position of the focus lens.

Hereinafter, similarly to the case described in FIG. 6, the present exemplary embodiment is described with respect to the case where a focal position is moved from a point A to a point B and the case where a focal position is moved from the point A to a point C. However, in order to provide clear descriptions, it is assumed that a focal plane 703 is focused on the distant-view object 608 when a focal position thereof is the point A.

In FIG. 7, when the focal position is moved from the point A to the point B, the motor for driving the focus lens is rotated in the forward direction. As described in FIG. 6, when the motor for driving the focus lens is rotated in the forward direction, the focal plane is shifted in a direction the focal plane approaches the camera 100, so that the focal plane is rotated in a direction indicated by an arrow 705 by making the intersection point 701 as an axis. A focal plane when the focal position is moved to the point B is specified as a focal plane 702. When compared to the example illustrated in FIG. 6, in which the focal position is moved from the point A to the point B, it is found that the focal plane is shifted in a direction the focal plane is away from the near-view object 607.

In a case where the focal position is moved from the point A to the point C in FIG. 7, the motor for driving the focus lens is rotated in a backward direction. When the motor for driving the focus lens is rotated in the backward direction, the focal plane is shifted in a direction the focal plane is away from the camera 100, so that the focal plane is rotated in a direction indicated by an arrow 706 by making the intersection point 701 as an axis. A focal plane when the focal position is moved to the point C is specified as a focal plane 704. As described above, different from the example illustrated in FIG. 6, in which the focal position is moved from the point A to the point C, the focal plane is shifted in a direction the focal plane approaches the near-view object 607.

Thus, the user has to change a driving direction of the focus lens depending on the tilt angle of the camera 100.

As illustrated in FIG. 6, in a state where the camera 100 does not have a tilt angle, the user can intuitively operate the focus lens without difficulty because the focal plane is moved in a near-view direction (e.g., a direction the focal plane approaches the camera 100) in order to focus on the near-view object 607. On the contrary, in a case where the camera 100 has a tilt angle, the focal plane is shifted in a rotation direction by making the non-visible intersection point 701 as an axis. Thus, if the user intuitively operates the focus lens, the focal plane is erroneously operated and shifted in a direction different from a desired direction.

Therefore, in the present exemplary embodiment, a user interface (UI) is changed depending on a state of the tilt angle of the camera 100 in order to suppress the user's erroneous operation.

In the present exemplary embodiment, the camera 100 and the client apparatus 300 function as an information processing apparatus to judge whether a tilt angle exceeds a threshold and display a UI on the display device 400 by changing display of a UI depending on the judgement result. However, any one of the camera 100 and the client apparatus 300 may independently function as the above-described information apparatus, or another personal computer (PC) connected to the camera 100 and the client apparatus 300 may function as the above-described information processing apparatus.

Hereinafter, display control of a user interface depending on a tilt angle is described.

Figure 8:
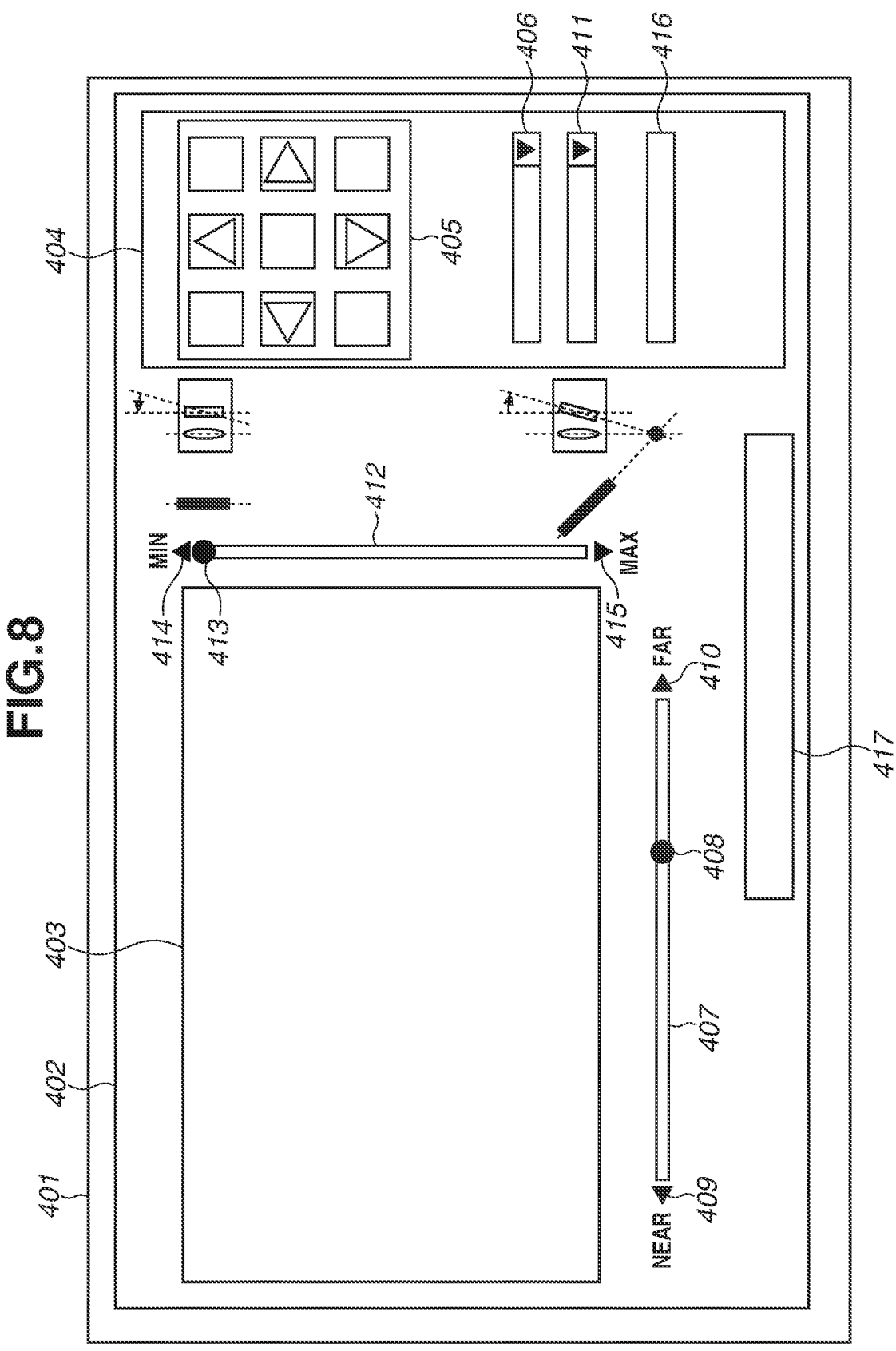
FIG. 8 is a diagram illustrating an example of a user interface for a non-tilt image capturing state.
Figure 9:
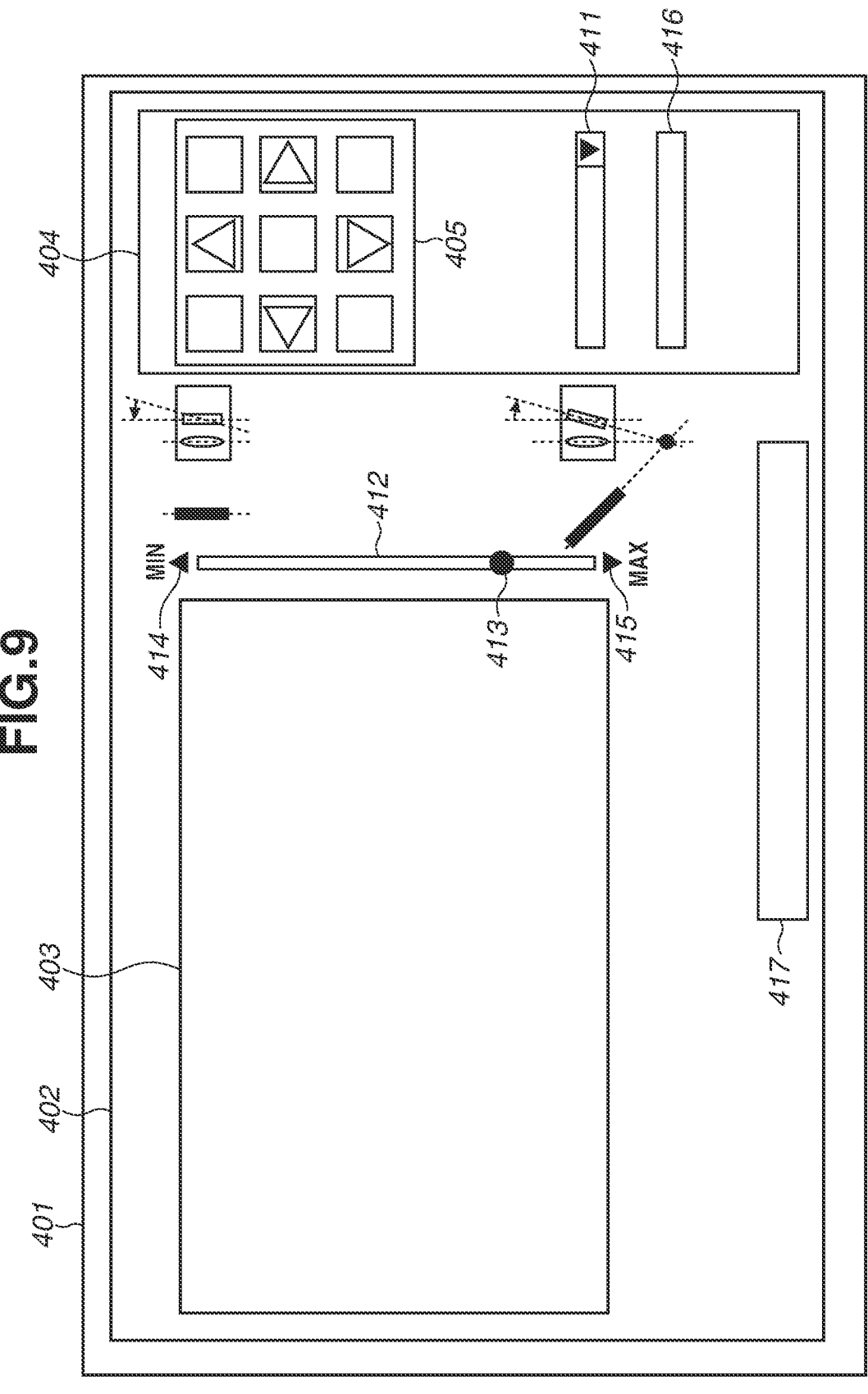
FIG. 9 is a diagram illustrating an example of a user interface for a tilt image capturing state.

FIG. 8 is a diagram illustrating an example of a UI in a non-tilt image capturing state. FIG. 9 is a diagram illustrating an example of a UI in a tilt image capturing state.

In each of FIGS. 8 and 9, a display window 402 which includes an image captured by the camera 100 and user interfaces is displayed on a display 401 of the display device 400. The display device 400 communicates with the client apparatus 300 and displays the display window 402 on the display 401.

A display image 403 is displayed in the display window 402. The display image 403 is an image captured by the camera 100.

On the display window 402, an operation button screen 404 is displayed. The operation button screen 404 includes a user interface for allowing the user to perform focus setting. The operation button screen 404 can further include user interfaces for allowing the user to perform exposure setting of the camera 100, parameter setting of image processing such as contrast and sharpness, and pan-tilt driving.

A direction button 405 is a user interface for allowing the user to perform pan-tilt driving and to change coordinates of a cutout image.

A setting button 406 is a manual setting button of the focus lens. A manual focus function is switched on/off through the setting button 406. When the user turns on the manual focus function, the camera 100 accepts an operation for changing a driving position of the focus lens from the user. When the manual focus function is turned on, the display device 400 displays a user interface for operating the focus lens on the display window 402 and accepts a user operation.

In contrast, when the manual focus function is turned off, the user interface for operating the focus lens does not accept user operations, such as click and drag. In other words, the user cannot operate the focus lens to an optional position. Although the user interface relating to the manual operation of the focus lens does not have to be displayed when the manual focus function is turned off, in one embodiment, the client apparatus 300 makes the user be aware of the inoperable state by graying out the user interface.

A bar 407 is a focus lens bar. The focus lens bar 407 is a user interface for allowing the user to operate the focus lens.

A button 408 displayed on top of the focus lens bar 407 is a focus lens position button. The focus lens position button 408 indicates a driving position of the focus lens of the camera 100. When the focus lens position button 408 is located on a side of a NEAR button 409, the focus lens is driven to a position at which the focal plane is on a near-view (NEAR) side. In contrast, when the focus lens position button 408 is located on a side of a FAR button 410, the focus lens is driven to a position at which the focal plane is on a distant-view (FAR) side.

In addition, a relationship between the driving position of the focus lens and a position of the focus lens position button 408 on the focus lens bar 407 can be non-linear.

The focus lens position button 408 may indicate a position of the focal plane. In this case, the camera 100 has a correspondence table of a position of the focal plane and a driving position of the focus lens, so that the camera 100 converts a position of the focal plane into a driving position of the focus lens with reference to the correspondence table and controls the driving position of the focus lens.

By dragging the focus lens position button 408 on the focus lens bar 407, the user can drive the focus lens of the camera 100 to a position corresponding to a position where the focus lens position button 408 is dragged. The user can also drive the focus lens of the camera 100 to a position corresponding to a clicked position by clicking the focus lens bar 407. At this time, the focus lens position button 408 is shifted to the clicked position.

In a vicinity of the NEAR button 409, a character string, a picture, or a value/unit is displayed which describes that a focal plane is shifted to a near-view (NEAR) side in tandem with driving of the focus lens. Examples of the character string include "NEAR", "Near", "Near View", "Front", and "Front Side". Examples of the picture include, for example, a picture of two persons where one person in front of the other person has a sharp outline whereas the other person behind the one person has a faint outline. Examples to be displayed for the value/unit include a small value, such as "0 m" and "0.1 m". These values indicate distances to the focal plane, and in one embodiment, the values is linked to the actual focus lens position of the camera 100.

Similarly, in a vicinity of the FAR button 410, a character string, a picture, or a value/unit is displayed which describes that a focal plane is shifted to a distant-view (FAR) side in tandem with driving of the focus lens. Examples of the character string to be displayed include "FAR", "Far", "Distant View", "Rear", and "Rear Side". Examples of the picture include, for example, a picture of two persons where one person in front of the other person has a faint outline whereas the other person staying behind the one person has a sharp outline. Examples to be displayed for the value/unit include a large value, such as "1000 m" and "∞ m". These values indicate distances to the focal plane, and in one embodiment, the values is to be linked to the focal plane corresponding to the actual focus lens position of the camera 100.

In a case where a value/unit is to be displayed, in one embodiment, the focus lens position button 408 indicates a position of the focal plane. Further, a character string, a picture, and a value/unit are not limited to the above-described examples, as long as the perspective can be expressed thereby.

A setting button 411 is a manual setting button for tilt driving. The user switches the manual setting and the automatic setting of tilt driving through the setting button 411. When the automatic setting is selected, a user's operation for adjusting a tilt angle of the image capturing element 12 is not accepted. In contrast, when the manual setting is selected, a user's operation for adjusting a tilt angle of the image capturing element 12 is accepted.

A bar 412 is a tilt bar. The tilt bar 412 is a user interface for allowing the user to operate a tilt angle of the image capturing element 12 of the camera 100.

A button 413 displayed on the tilt bar 412 is a tilt angle position button. The tilt angle position button 413 indicates a tilt angle of the camera 100. The tilt angle is small when the tilt angle position button 413 is on a side of a MIN button 414 (e.g., upper side). In contrast, the tilt angle is large when the tilt angle position button 413 is on a side of a MAX button 415 (e.g., lower side). FIG. 8 illustrates a state where the camera 100 does not have a tilt angle, i.e., the tilt angle is 0 degree. An operation method of the tilt bar 412 is similar to that of the focus lens bar 407.

In the example illustrated in FIG. 8, the button 413 displayed on the tilt bar 412 is a tilt angle position button. Alternatively, a distance from the camera 100 to the intersection point 701 in FIG. 7 may be indicated by the button 413. In this case, the camera 100 has a correspondence table of a distance from the camera 100 to the intersection point 701 and a tilt angle, so that the camera 100 converts a distance to the intersection point 701 into a tilt angle with reference to the correspondence table and controls tilt driving. Herein, a distance L from the camera 100 to the intersection point 701 can be calculated from a focal distance f and a tilt angle α. The focal distance f can previously be acquired or calculated from optical characteristics. The distance L from the camera 100 to the intersection point 701, the focal distance f, and the tilt angle α are illustrated in FIG. 7.

With respect to a direction of tilt (inclination), the image capturing element 12 which is inclined in one direction from a state where the camera 100 does not have a tilt angle (i.e., a state where the tilt angle is 0 degree) is described as an example. However, the image capturing element 12 may be inclined in an opposite direction, and may be operable in the opposite direction through the user interface.

The user can drive the tilt angle of the camera 100 in a direction the tilt angle becomes small by clicking the MIN button 414. In one embodiment, a character string, a picture, or a value/unit which describes that the tilt angle becomes small be displayed in a vicinity of the MIN button 414. For example, a character string such as "MIN" or "Small" is displayed as the character string. Examples of the picture to be displayed include a side view which expresses a relationship between the camera 100 and a focal plane, and a side view which expresses an inclination direction of the image capturing element 12. Examples of the value/unit include, for example, "0°".

Similarly, the user can drive the tilt angle of the camera 100 in a direction the tilt angle becomes great by clicking the MAX button 415. In one embodiment, a character string, a picture, or a value/unit which describes that the tilt angle becomes great be displayed in a vicinity of the MAX button 415. For example, a character string such as "MAX" or "Large" is displayed as the character string. A side view which expresses a relationship between the camera 100 and a focal plane, or a side view which expresses an inclination direction of the image capturing element 12 is displayed as the picture. As the value/unit, for example, "45°" is displayed.

In FIG. 8, although the user interface for operating a tilt angle has "MAX" on the lower side and "MIN" on the upper side, arrangement thereof is not limited thereto.

Further, a character, a picture, or a value/unit displayed on the user interface for operating a tilt angle is not limited to a character, a picture, or a value/unit which expresses a magnitude of a tilt angle. For example, a character, a picture, or a value/unit which expresses a length corresponding to a distance from the camera 100 to the intersection point 701 may be displayed on the user interface for operating a tilt angle.

Examples of the character string include "Long", "Short", "LONG", and "SHORT". Examples of the value/unit include "∞ m", and "0.1 m".

Alternatively, the user interface for operating a tilt angle can display a character string, a picture, or a value/unit which expresses a height of the focal plane or a height of the intersection point 701. Examples of the character string include "Down", "Up", "Bottom", "Top", "Low", "High", "LOW", and "HIGH".

Alternatively, the user interface for operating a tilt angle may display a picture of the intersection point 701 whose position is shifted by the operation of a tilt angle. Alternatively, the user interface for operating a tilt angle can also display a character string "Clockwise (CW)", "Counterclockwise (CCW)", "Forward Rotation", or "Backward Rotation", which expresses an angle and a rotation direction of the image capturing element 12 and the focal plane. Alternatively, the user interface for operating a tilt angle may also be displayed upside down or transversely.

In the present exemplary embodiment, a method of expressing a magnitude, a length, a height, or a rotation direction is described as an example. However, the present exemplary embodiment is not limited to the above. In one embodiment, contents to be expressed are changed for each of the tilt image capturing state and the non-tilt image capturing state. Alternatively, a height or a length can be expressed by a unit "m", and an angle of rotation can be expressed by using a unit "radian", "degree", "deg.", or "°".

An autofocus button 416 is a button for executing autofocusing.

When the autofocus button 416 is clicked, the camera 100 acquires an evaluation value of the focus and readjusts the focus lens and the tilt angle. Although the autofocus button 416 is used for simultaneously readjusting the focus lens and the tilt angle, a button for individually readjusting the focus lens and the tilt angle may also be provided.

A status bar 417 displays status, such as an error and a current driving position of the focus lens. For example, the status bar 417 may display whether the camera 100 is in a tilt image capturing state or a non-tilt image capturing state.

In a vicinity of the user interface for operating a tilt angle, a character string "Tilt" or "Tilt Angle" may be displayed. Alternatively, a character string "Focus Lens" may be displayed in a vicinity of the user interface for operating the focus lens. Alternatively, since "Focus" is generally used to refer to a focus lens, "Focus" or "FOCUS" may be displayed on the user interface.

As illustrated in FIG. 9, the user interface for manually operating the focus lens, which is operable by the user in FIG. 8, is not displayed in the tilt image capturing state. In here, a tilt image capturing state refers to a state where the tilt angle exceeds a threshold.

Specifically, the manual setting button 406 of the focus lens, the focus lens bar 407, the focus lens position button 408, the NEAR button 409, and the FAR button 410 in FIG. 8 are not displayed in the tilt image capturing state as illustrated in FIG. 9. Hereinafter, the user interface for operating the focus lens refers to the above-described user interfaces.

As described above, the user interface for operating the focus lens is hidden in the tile image capturing state so that a manual operation of the focus lens is not accepted from the user.

An operation according to the present exemplary embodiment will now be described.

Figure 10:
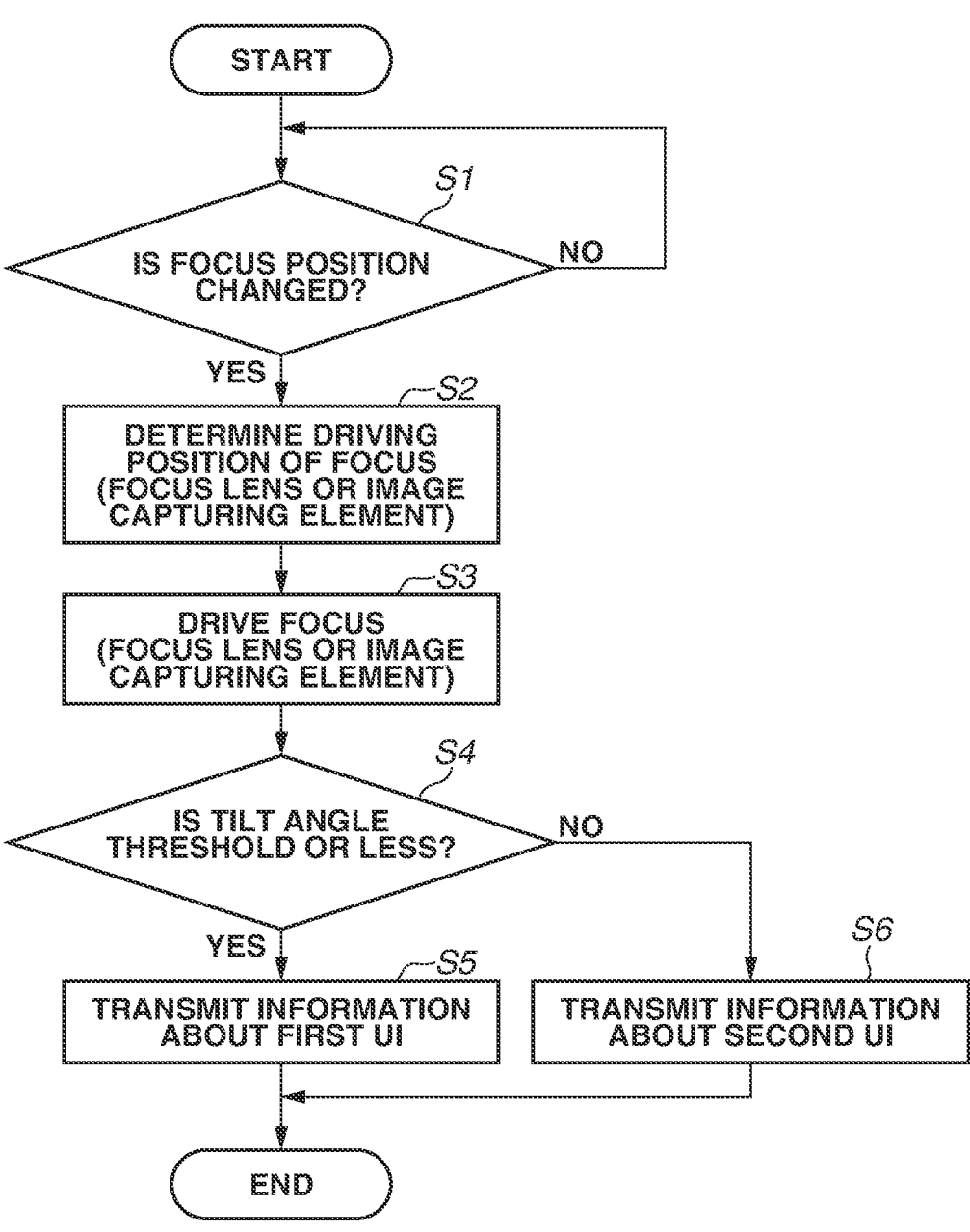
FIG. 10 is a flowchart illustrating operations of the image capturing apparatus.

FIG. 10 is a flowchart illustrating the operation of the camera 100 according to the present exemplary embodiment.

The CPU 16 in FIG. 2 reads and executes a program to enable the camera 100 to implement the respective pieces of processing illustrated in FIG. 10. Hereinafter, an alphabet "S" represents "Step" in the flowchart.

A first user interface (first UI) in step S5 in FIG. 10 is the user interface for the non-tilt image capturing state illustrated in FIG. 8. A second user interface (second UI) in step S6 is the UI for the tilt image capturing state illustrated in FIG. 9.

The present exemplary embodiment is described, as a specific example, based on conditions that, the camera 100 does not have a tilt angle (a tilt angle is 0 degree) when the processing in FIG. 10 is started as illustrated in FIG. 6, and the user interface for operating the focus lens is displayed as illustrated in FIG. 8. However, the present exemplary embodiment is also applicable to the case where the processing is started in a state where the camera 100 has a tilt angle (a tilt angle is not 0 degree) as illustrated in FIG. 7.

In step S1, the acquisition unit 101 of the camera 100 firstly judges whether a position of the focus (the focus lens or the tilt angle) is changed. For example, a position of the focus is changed when the autofocus button 416 in FIG. 8 is selected or a user interface for changing the focus lens or the tilt angle is operated. When the acquisition unit 101 acquires the above-described operation information from the client apparatus 300, the acquisition unit 101 judges that a position of the focus is changed.

In a case where the acquisition unit 101 judges that a position of the focus is changed (YES in step S1), the processing proceeds to step S2. In a case where the acquisition unit 101 judges that a position of the focus is not changed (NO in step S1), the processing returns to step S1. Then, the processing is brought into a stand-by (loop) state.

In step S2, the determination unit 102 determines a driving position of the focus (e.g., a driving position of the focus lens or the image capturing element 12). When the user has selected the autofocus button 416, the determination unit 102 executes predetermined autofocus control to determine driving positions of the focus lens and the image capturing element 12. In contrast, when the user performs a manual operation to operate the focus lens or the tilt angle, the determination unit 102 determines a driving position depending on contents of the operation (e.g., an operated user interface, a dragged position, the number of clicks, or a clicked position).

In step S3, the focus lens control unit 105 and the tilt control unit 106 execute driving control of the focus (the focus lens and the image capturing element 12) based on a driving position determined in step S2.

In step S4, the tilt angle judgement unit 107 judges whether the tilt angle is less than or equal to a threshold.

Herein, by taking a tilt angle $\alpha=0°$ as a threshold, in a case where the tilt angle is 0° or less, i.e., the camera 100 does not have a tilt angle (YES in step S4), the processing proceeds to step S5. In contrast, in a case where the tilt angle judgement unit 107 judges that the tilt angle exceeds the threshold (NO in step S4), the processing proceeds to step S6. For example, the processing proceeds to step S5 in a state where the camera 100 does not have a tilt angle as illustrated in FIG. 6, and the processing proceeds to step S6 in a state where the camera 100 has a tilt angle as illustrated in FIG. 7.

In step S5, the communication control unit 104 transmits information about the first UI (an image including the first UI) to the client apparatus 300. The client apparatus 300 thereby displays the user interface for the non-tilt image capturing state illustrated in FIG. 8 on the display device 400.

In step S6, the communication control unit 104 transmits information about the second UI (an image including the second UI) to the client apparatus 300. The client apparatus 300 thereby displays the user interface for the tilt image capturing state illustrated in FIG. 9 on the display device 400.

In a case where the user interface is switched from the first UI to the second UI or the other way around, in one embodiment, the user is notified that a user interface is to be switched.

As described above, it is possible to prevent the user from erroneously operating the focus lens when tilt image capturing is executed, by switching a display of the user interface relating to the manual operation of the focus lens depending on whether the tilt angle exceeds the threshold.

In the above-described present exemplary embodiment, the processing illustrated in FIG. 10 is executed by the camera 100. However, all or part of the processing in FIG. 10 may be executed by the client apparatus 300.

Variations

Figure 11:
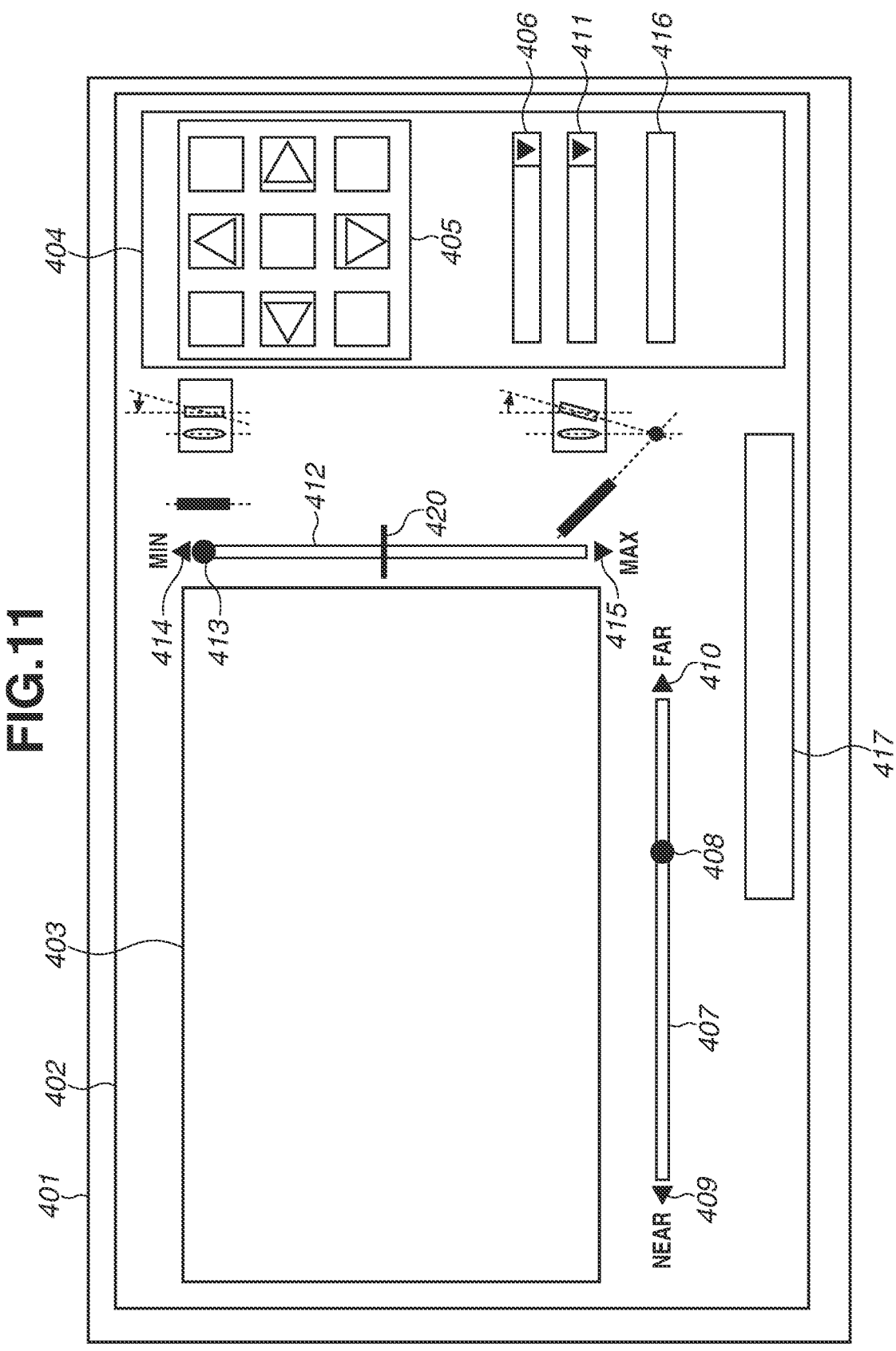
FIG. 11 is a diagram illustrating another example of a user interface for a non-tilt image capturing state.

In the above-described exemplary embodiment, the user interfaces illustrated in FIG. 8 are displayed in the non-tilt image capturing state. However, a user interface for the non-tilt image capturing state is not limited to the above. For example, as illustrated in FIG. 11, a user interface can also be displayed which illustrates a range of the tilt angle in which the user cannot manually operate the focus lens. In FIG. 11, a threshold 420 of the tilt angle is displayed on the user interface illustrated in FIG. 8.

A determination of as to whether the focus lens is manually operable is made depending on the tilt angle. The threshold 420 in FIG. 11 indicates a border of whether focus lens is manually operable.

When a tilt angle is on the MAX side than the threshold 420, a user interface which does not allow the user to manually operate the focus lens is displayed as illustrated in FIG. 9. In contrast, when a tilt angle is on the MIN side than the threshold 420, a user interface which allows the user to manually operate the focus lens is displayed as illustrated in FIG. 11. The user can also change a position of the threshold 420 via the user interface.

As described above, the user can visually judge whether the focus lens is manually operable by displaying the threshold 420 on the user interface. It is thus possible to suppress the user's erroneous operations.

In FIG. 11, a border is expressed by the threshold 420, but alternatively, a threshold (a border between regions) may visually be expressed by coloring or shading the regions.

In this case, in one embodiment, the driving positions are to be automatically and independently adjusted through an autofocus button (not illustrated) for adjusting the focus lens and an autofocus button (not illustrated) for adjusting the tilt angle. In another embodiment, a tilt angle initialization button (not illustrated) is provided and the tilt angle initialization button be operated, so that the user can automatically bring the camera 100 into a state where the camera 100 does not have a tilt angle.

In the present exemplary embodiment, a threshold of the tilt angle is set to 0°, and a user interface is changed depending on presence or absence of the tilt angle. However, the exemplary embodiment is not limited to the above. A threshold of the tilt angle can optionally be set within a movable range of the image capturing element 12. In other words, a tilt angle in a middle of the movable range of the image capturing element 12 may be specified as a threshold. However, the focal plane generally operates in the forward-backward direction, it is therefore, in one embodiment a relatively small value (0° to 10°) is set as a threshold of the tilt angle.

In the above-described exemplary embodiment, a display of the user interface may also be switched depending on whether an angle θ formed between the focal plane and the optical axis illustrated in FIG. 7 is less than a predetermined angle.

When looking at the side view illustrated in FIG. 7, as an extreme case, the focal plane is shifted forward and backward when the tilt angle is 0°, and the focal plane is shifted upward and downward when the tilt angle is 90°. Thus, the angle θ of 45° (θ=45°) can be specified as a switching point where the shift direction is switched between the forward-backward direction and the upward-downward direction. However, the focal plane generally operates in the forward-backward direction. It is thus, in one embodiment, a threshold (the above-described predetermined angle) of the angle θ formed between the focal plane and the optical axis is set to 45° to 90°. In a case where the threshold is set to 50°, the user interface for the non-tilt image capturing state is displayed when the angle θ is 50° or more, and the user interface for the tilt image capturing state is displayed when the angle θ is less than 50°.

Herein, the angle θ is an angle determined by a tilt angle α and a focal position. Accordingly, in a case where the angle θ is judged to be less than the predetermined angle based on a driving position of the image capturing element 12 and a driving position of the focus lens, the tilt angle judgement unit 107 in FIG. 4 may judge that the tilt angle α is more than or equal to the threshold.

In a case where the user performs a manual operation at an angle close to the threshold of the tilt angle, the user interface may be maintained without being switched to another. With this configuration, the user can smoothly perform the operation without waiting for the user interface to be switched.

The tilt angle judgement unit 107 may also judge whether tilt image capturing is executed based on a position of the intersection point 701 in FIG. 7. Specifically, the tilt angle judgement unit 107 judges that tilt image capturing is executed when the intersection point 701 is located at a position higher than a vicinity of a ground where the object exists.

Alternatively, a tilt image capturing button for switching on and off the tilt image capturing state may be displayed on the display window 402 displayed on the display 401. A user interface for the tilt image capturing state is constantly displayed when the tilt image capturing button is turned on, and a user interface for the non-tilt image capturing state is displayed when the tilt image capturing button is turned off. In a case where the tilt image capturing button is turned off, the tilt angle is also shifted and fixed to 0°. In this case, the camera 100 does not change the tilt angle until the tilt image capturing button is turned on.

In the above-described exemplary embodiment, a user interface for operating the focus lens is not displayed in the tilt image capturing state, and thereby occurrence of an erroneous operation of the focus lens is suppressed when tilt image capturing is being executed. However, a user interface for suppressing the occurrence of a user's erroneous operation of the focus lens in the tilt image capturing state is not limited to the above. Hereinafter, examples of a plurality of user interfaces for suppressing a user's erroneous operation of the focus lens in the tilt image capturing state will be described.

Figure 12:
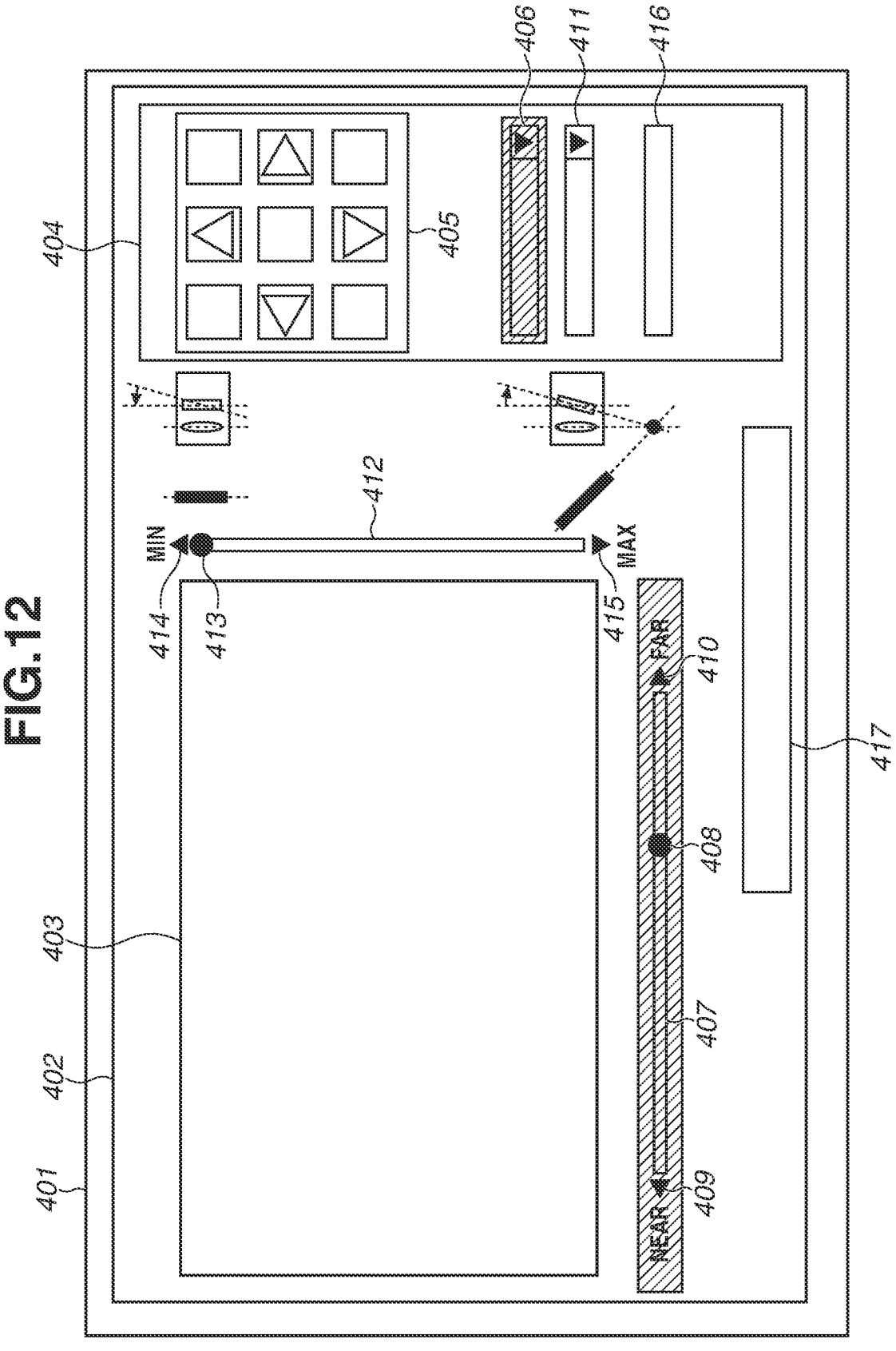
FIG. 12 is a diagram illustrating another example of a user interface for a tilt image capturing state.

For example, in the tilt image capturing state, a user interface for operating the focus lens may be locked and brought into an inoperable state. In this case, for example, a user interface for operating the focus lens may be grayed out as illustrated in FIG. 12. The user interface illustrated in FIG. 12 is different from the user interface illustrated in FIG. 9 in that a user interface for operating the focus lens is grayed out. In FIG. 12, a gray-out area (an area filled with translucent gray color) is indicated by hatched lines. The gray-out user interface does not accept a manual operation of the focus lens from the user. Thus, the user cannot manually operate the driving position of the focus lens of the camera 100.

However, in one embodiment, the focus lens is driven by autofocusing. The user can drive the focus lens to a position of the focus lens automatically judged by the camera 100 by operating the autofocus button 416.

In the above-described exemplary embodiment, the operation is locked by graying out the user interface. However, the method for locking the operation is not limited to the method of locking the operation by filling the corresponding area with translucent gray color described above. For example, the corresponding area may be shaded or filled with another color, or a pop-up window indicating an inoperable state may be displayed thereon. In other words, any user interface can be used as long as the user can visually recognize that the focus lens cannot be operated manually.

In the tilt image capturing state, a user interface for operating the focus lens may be switched to a user interface different from a user interface for the non-tilt image capturing state. For example, with respect to a user interface displayed in the tilt image capturing state, a position and/or a shape of the focus bar or information (e.g., a character, a picture, a value/unit) indicating a shift direction of the focal plane, shifted in tandem with driving of the focus lens, may be changed.

Figure 13:
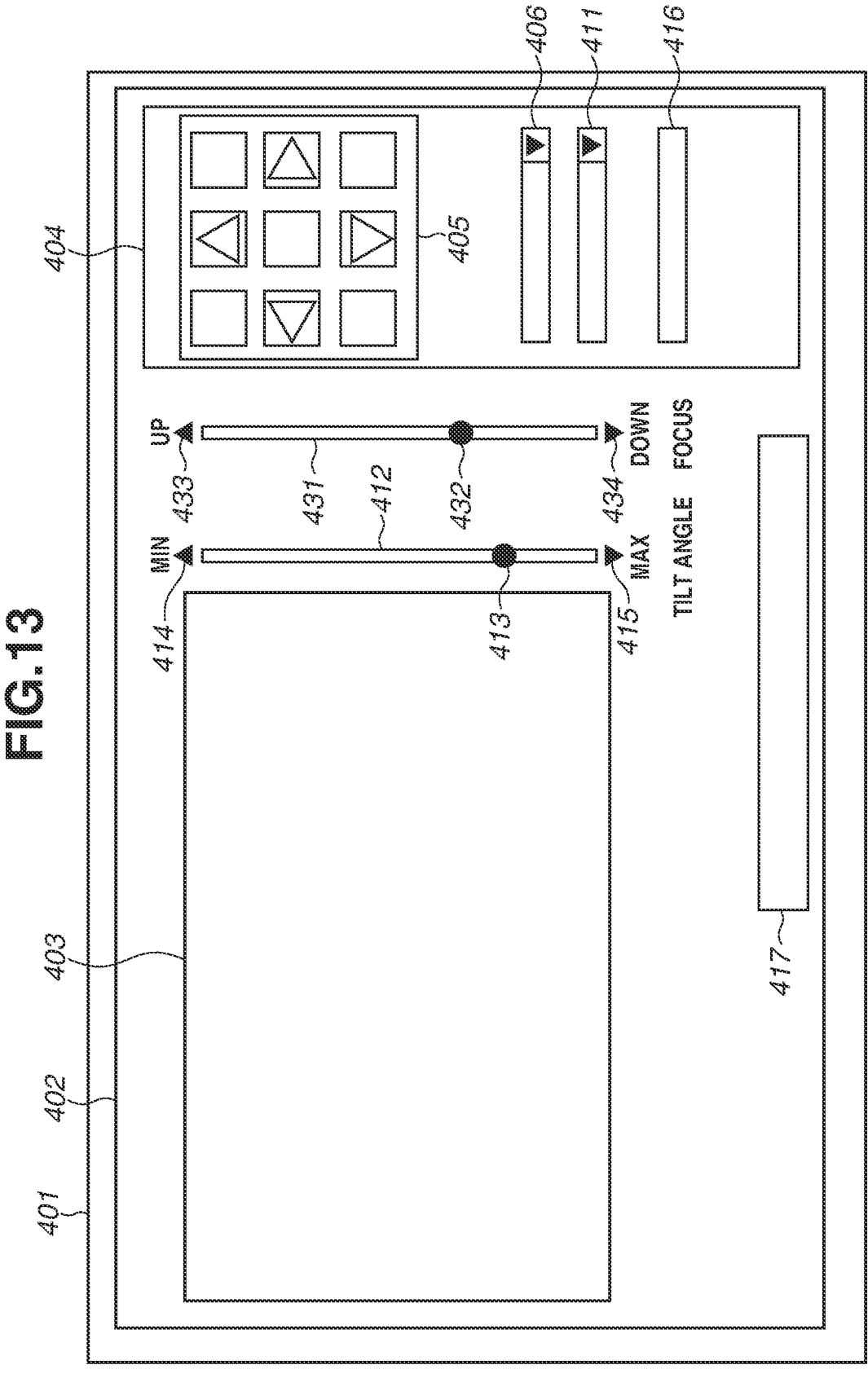
FIG. 13 is a diagram illustrating another example of a user interface for a tilt image capturing state.

As illustrated in FIG. 13, a position of the focus bar for operating the focus lens and a character string which describes a shift direction of the focal plane are changed and displayed in the tilt image capturing state.

Similarly to the focus lens bar 407 in FIG. 8, a focus lens bar 431 is a user interface for indicating a driving position of the focus lens. Further, a focus lens position button 432 is a button similar to the focus lens position button 408 in FIG. 8. When the focus lens position button 432 is on a side of an UP button 433, the focus lens is driven to a position at which the focal plane is on an UP (NEAR) side. When the focus lens position button 432 is on a side of a DOWN button 434, the focus lens is driven to a position at which the focal plane is on a DOWN (FAR) side. In terms of driving of the focus lens, the UP button 433 in FIG. 13 is similar to the NEAR button 409 in FIG. 8, and the DOWN button 434 in FIG. 13 is similar to the FAR button 410 in FIG. 8.

The focus lens bar 407 in FIG. 8 and the focus lens bar 431 in FIG. 13 are arranged at different positions in different orientations in the display window 402. As illustrated in FIG. 7, in the tilt image capturing state, the focus lens is driven to cause the focal plane to be moved in the up-down direction. Therefore, the focus lens bar 431 is arranged in such an orientation in which the up-down direction in FIG. 13 corresponds to the driving range of the focus lens. Further, as illustrated in FIG. 13, a position of the focus lens bar 431 is changed to a position on the right side of the display image 403 from a position on the lower side of the display image 403 in FIG. 8.

As described above, by changing a position and an orientation of the focus lens bar, the user can intuitively understand that a shift direction of the focal plane is changed in tandem with driving of the focus lens, so that it is possible to suppress occurrence of an erroneous operation.

Further, in this case, a character string which describes a shift direction of the focal plane which is shifted in tandem with driving of the focus lens may be changed. In an image viewed from the user, it seems as if the focal plane is shifted in the up-down direction instead of the forward-backward (near-far) direction when the tilt angle is large. Thus, a character string "NEAR" in FIG. 8 is changed to a character string "Up", "Top", "High", "UP", or "HIGH". Similarly, a character string "FAR" in FIG. 8 is changed to a character string "Down", "Bottom", "Low", "DOWN", or "LOW". In FIG. 13, a case where character strings are "UP" and "DOWN" is displayed.

As described above, the user can easily understand that a shift direction of the focal plane is changed in tandem with driving of the focus lens by changing the character string describing a shift direction of the focal plane which is shifted in tandem with driving of the focus lens. It is thereby possible to suppress occurrence of an erroneous operation. As with the case of the character string described above, a picture or a value/unit may be changed to a picture or a value/unit which expresses a change of the shift direction of the focal plane. In this case, effect similar to the effect acquired from the change of the character string can be acquired.

Figure 14:
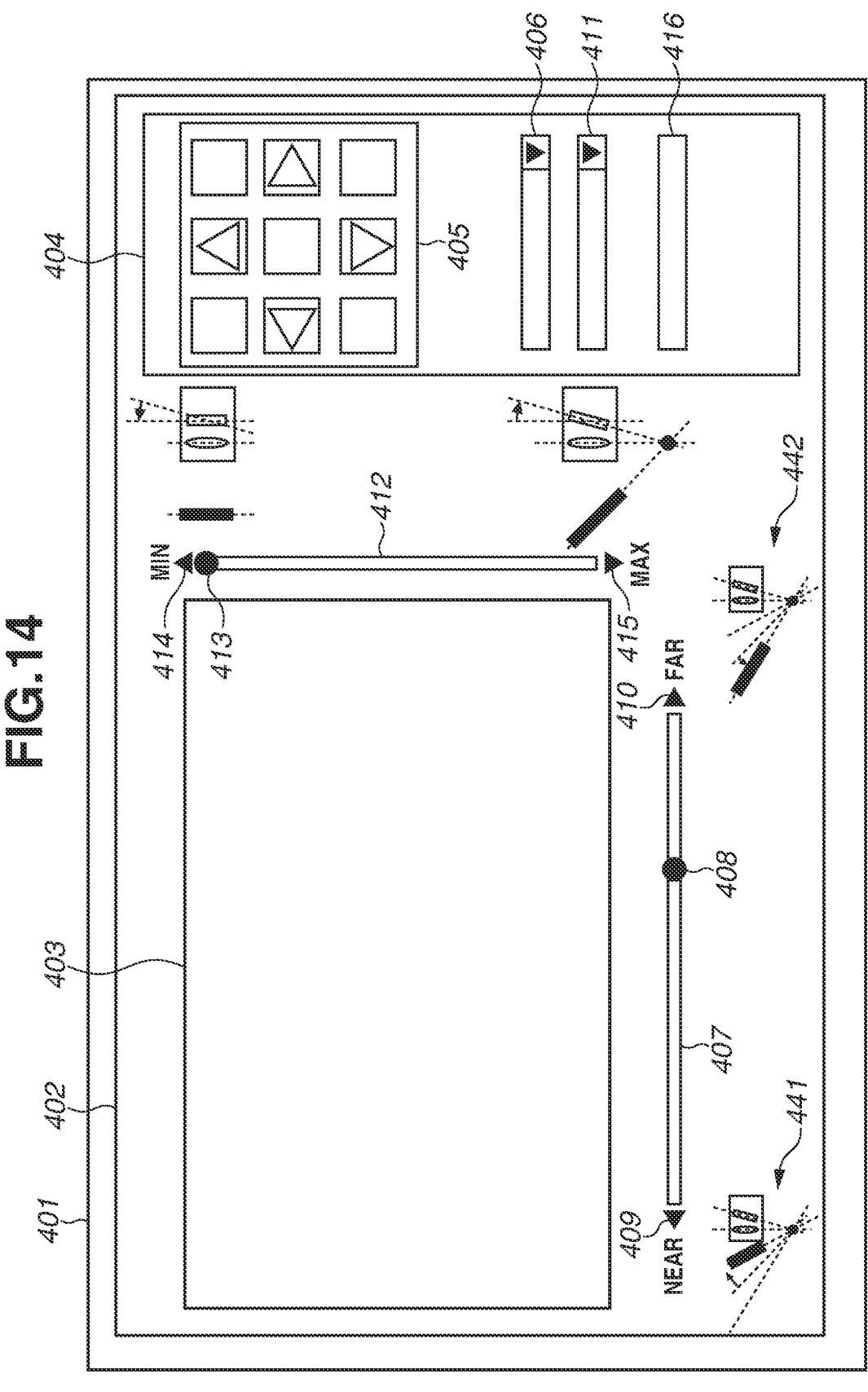
FIG. 14 is a diagram illustrating another example of a user interface for a tilt image capturing state.

Alternatively, in the tilt image capturing state, a picture which expresses a shift direction (rotation direction) of the focal plane may be displayed in a vicinity of the focus lens bar 407, as illustrated in FIG. 14, without changing a position and an orientation of the focus lens bar 407.

A picture 441 of "NEAR" illustrates a state where the focal plane is rotated to the NEAR side. A picture 442 of "FAR" illustrates a state where the focal plane is rotated to the FAR side. As described above, a picture which clearly expresses the movement of the focal plane is displayed in a state where the camera 100 has a tilt angle. Then, in a state where the camera 100 does not have a tilt angle, a picture is not displayed, or a picture of the focal plane shifted in the forward-backward direction is displayed thereon. As described above, the user can briefly figure out a shift direction of the focal plane by changing a picture in a state where the camera 100 has a tilt angle. It is thus possible to suppress occurrence of an erroneous operation.

Alternatively, at this time, a character string which describes a shift direction (rotation direction) of the focal plane may be displayed in a vicinity of a picture which expresses a shift direction (rotation direction) of the focal plane. Examples of the character string include "Clockwise", "Counterclockwise", "Forward", "Backward", "CW", or "CCW". Alternatively, an angle of the focal plane may be displayed as the information describing a shift direction of the focal plane.

In FIG. 14, illustration of the status bar 417 is omitted, but the status bar 417 may be displayed thereon.

Figure 15:
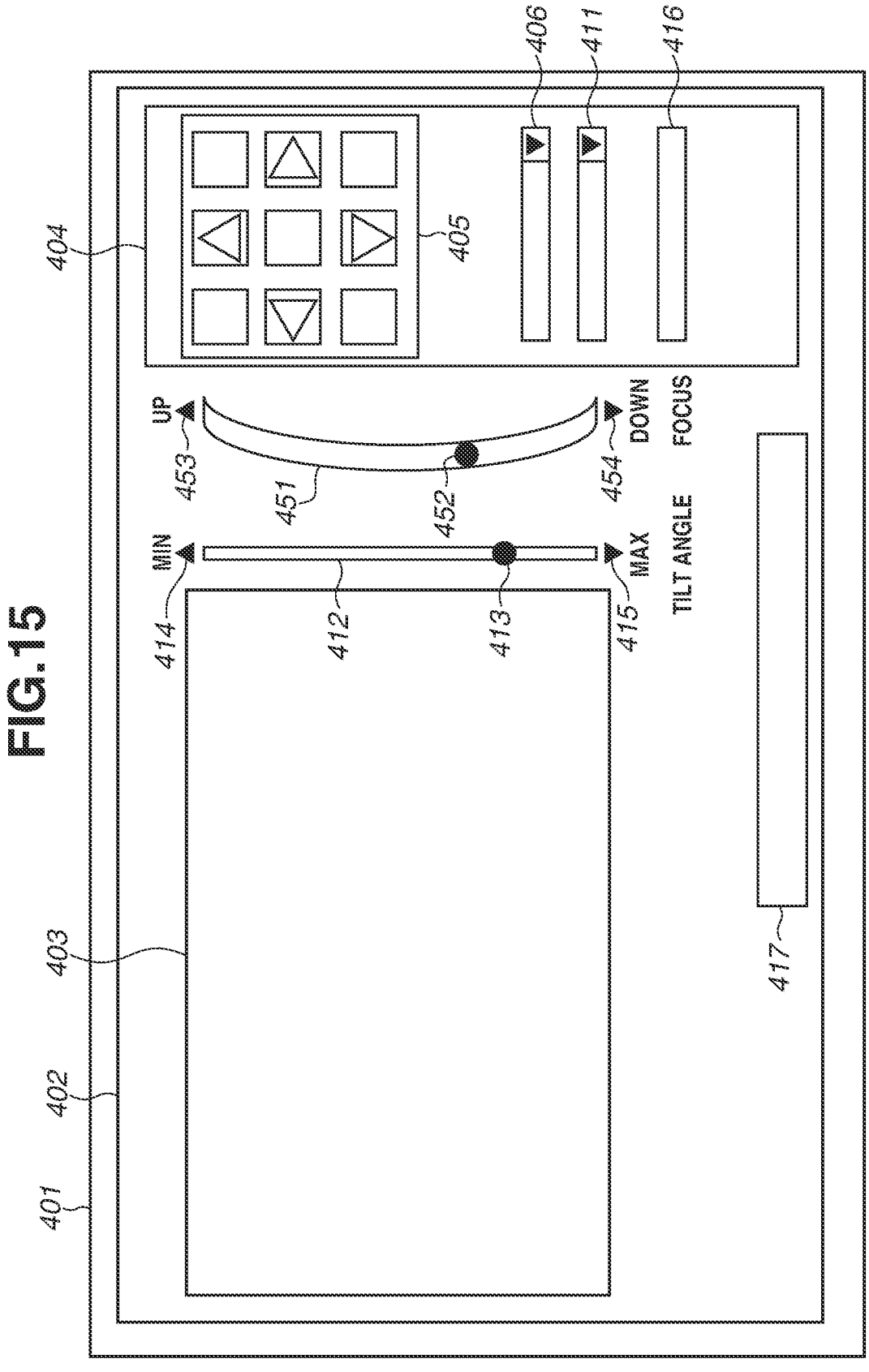
FIG. 15 is a diagram illustrating another example of a user interface for a tilt image capturing state.

In the tilt image capturing state, a shape of the focus lens bar for controlling the focus lens may also be changed as illustrated in FIG. 15.

A focus lens bar 451 in FIG. 15 has an arc-like shape. In a state where the camera 100 does not have a tilt angle, the focal plane is shifted in a forward-backward (rectilinear) direction, and thus, in one embodiment, a focus lens bar have a rectilinear shape, such as a shape of the focus lens bar 407 illustrated in FIG. 8. In contrast, in a state where the camera 100 has a tilt angle, the focal plane is shifted in a rotation direction by making the intersection point 701 described in the Scheimpflug principle in FIG. 7 as a center. Thus, the user can easily understand a user interface shifted in a rotation direction, such as the arc-like focus lens bar 451 illustrated in FIG. 15. As described above, it is possible to suppress occurrence of a user's erroneous operation by changing a shape of the focus lens bar depending on a state of the tilt angle.

In FIG. 15, a focus lens position button 452, an UP button 453, and a DOWN button 454 have functions similar to the functions of the focus lens position button 432, the UP button 433, and the DOWN button 434 in FIG. 13.

Alternatively, in the non-tilt image capturing state, a user interface for operating the tilt angle and a user interface for operating the focus lens are provided separately. However, in the tilt image capturing state, these user interfaces may be integrated. For example, in the tilt image capturing state, user interfaces relating to the focus lens and the tilt angle may be displayed integrally.

As illustrated in FIG. 7, the focus plane is rotated by making the intersection point 701 as an axis in a state where the camera 100 has a tilt angle. The intersection point 701 is also shifted depending on the tilt angle α. When the tilt angle α is small, a position of the intersection point 701 is moved away from the camera 100 toward a lower side of a sheet surface in FIG. 7. In contrast, when the tilt angle α is large, a position of the intersection point 701 approaches the camera 100. When focusing on the intersection point 701, the intersection point 701 is thereby located on a lower side when the tilt angle α is smaller (close to a side of "MIN" in FIG. 16). In other words, the user can visually recognize a position of the intersection point 701 without difficulty when "MIN" is arranged on the lower side.

Figure 16:
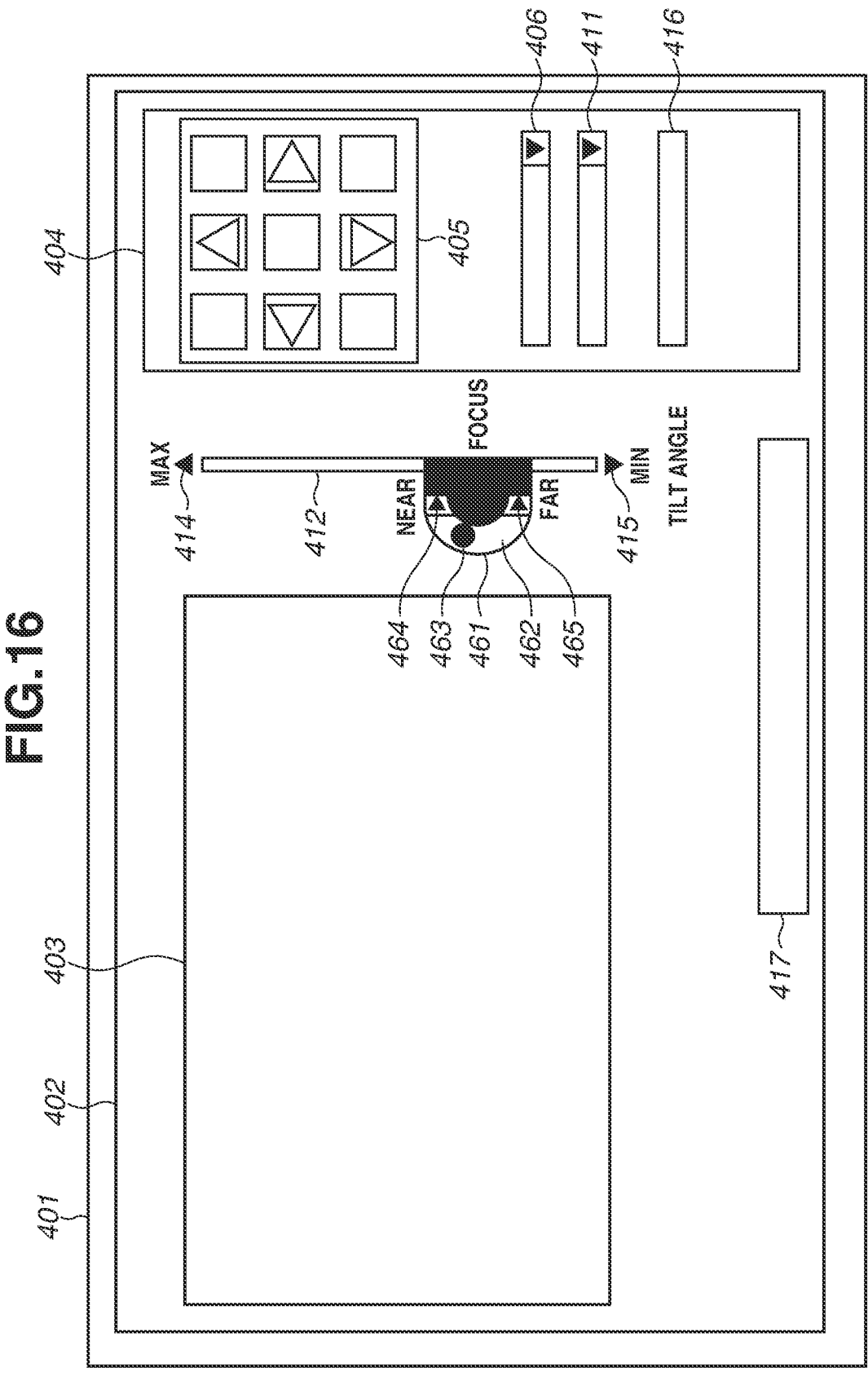
FIG. 16 is a diagram illustrating another example of a user interface for a tilt image capturing state.

In FIG. 16, an integrated button 461 is arranged on the tilt bar 412. In the integrated button 461, a tilt angle position button, a focus lens bar, a focus lens position button, a NEAR button, and a FAR button are arranged integrally. Similarly to the tilt angle position button 413 in FIG. 8, the integrated button 461 can be operated on the tilt bar 412 through a drag operation.

The integrated button 461 includes a focus lens bar 462, a focus lens position button 463, a NEAR button 464, and a FAR button 465. Although these user interfaces are included in the integrated button 461 and different reference numbers are applied thereto, functions of these user interfaces are similar to the functions of the focus lens bar 407, the focus lens position button 408, the NEAR button 409, and the FAR button 410 in FIG. 8.

As described above, in a state where the camera 100 has a tilt angle, an integrated user interface in which a position of the user interface of the focus lens is shifted in conjunction with the position of the tilt angle is displayed.

With this configuration, the user can visually understand that the focal plane is shifted depending on the tilt angle, so that occurrence of a user's erroneous operation can be suppressed.

In FIG. 16, character strings "NEAR" and "FAR" are respectively displayed in vicinities of the NEAR button 464 and the FAR button 465, but a character string, a picture, and a value/unit can be changed optionally as described above.

Figure 17:
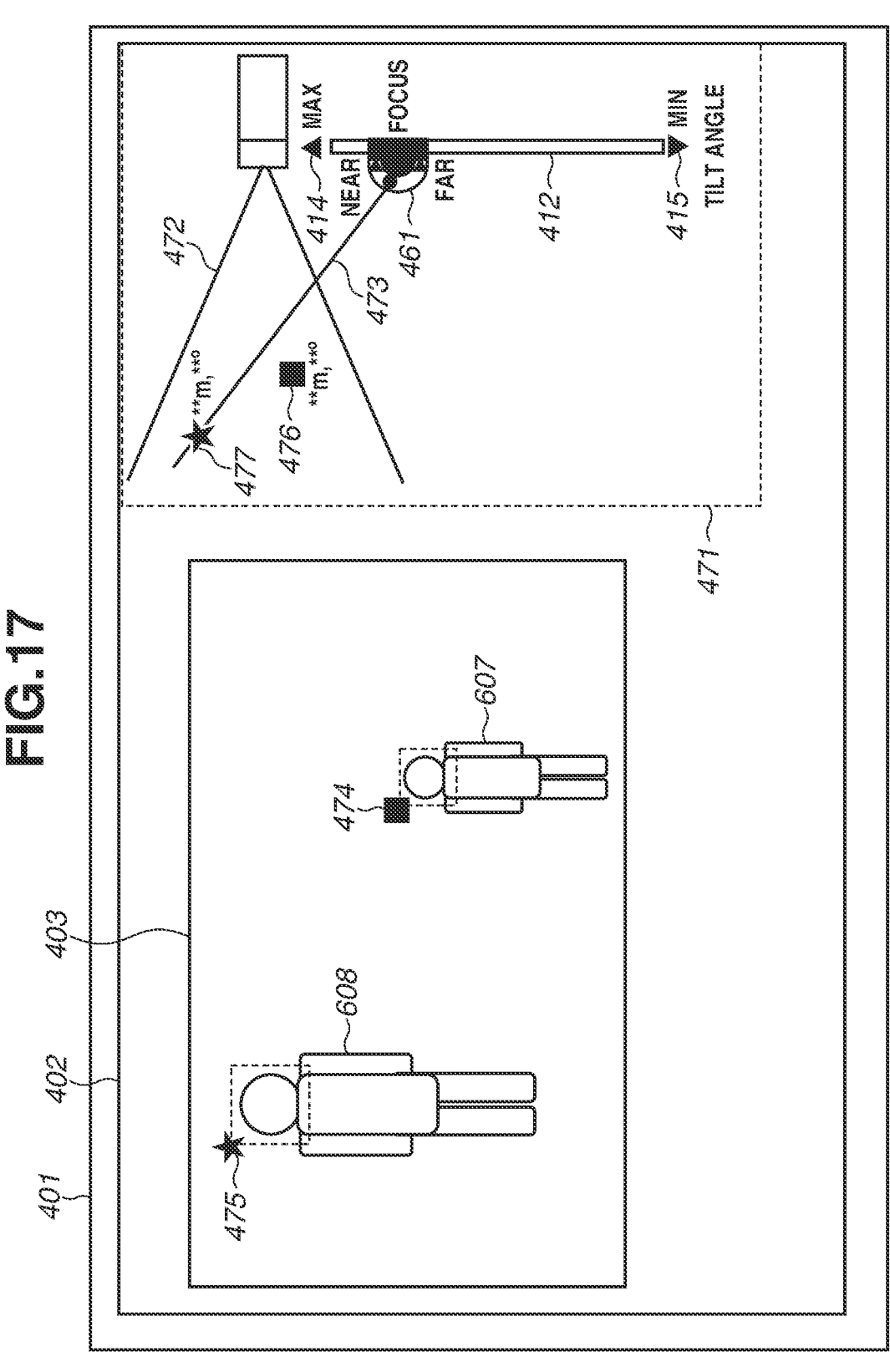
FIG. 17 is a diagram illustrating another example of a user interface for a tilt image capturing state.

Alternatively, a distance to the object may be superimposed and displayed on a user interface (picture) linked to the tilt angle and the focal position as illustrated in FIG. 17. In this way, the user can clearly figure out a positional relationship between the object and the focal plane, and easily find out a direction the focus lens is to be operated manually. It is therefore possible to suppress occurrence of a user's erroneous manual operation of the focus lens.

Hereinafter, a user interface which illustrates a positional relationship between the object and the focal plane will now be described with reference to FIG. 17.

In FIG. 17, a side view 471 of the camera 100 is displayed as a user interface.

The side view 471 displays a side view of an image capturing range 472 of the camera 100, and also displays a position of a focal plane 473 linked to a driving position of the image capturing element 12 and a driving position of the focus lens of the camera 100. At this time, in one embodiment, the actual image capturing range of the camera 100 correspond to the image capturing range 472 illustrated in the side view 471. As illustrated in FIG. 17, and also that the image capturing range 472 and the focal plane 473 are displayed simultaneously.

The camera 100 can acquire information about a distance to the object through an image plane phase difference AF method. In the image plane phase difference AF method, a phase difference is calculated with respect to an object position in an image capturing range. A distance can be converted from the phase difference and optical characteristics.

In FIG. 17, user interfaces for manually operating the focus lens and the tilt angle are similar to those illustrated in FIG. 16. Thus, the same reference numbers are applied thereto, and descriptions thereof are omitted.

A display image 403 in FIG. 17 corresponds to an image capturing range under the image capturing condition illustrated in FIG. 7, and the near-view object 607 and the distant-view object 608 are displayed thereon. At this time, the camera 100 acquires distance information of the near-view object 607. A mark 474 (black square) is then superimposed and displayed on the display image 403 to indicate a position of the object whose distance information is acquired. Similarly, the camera 100 acquires distance information of the distant-view object 608. At this time, a mark 475 (black star) is superimposed and displayed on the display image 403 to indicate a position of the object whose distance information is acquired.

In the side view 471, marks identical or similar to the marks 474 and 475 are displayed in the image capturing range 472 at positions corresponding to the positions and distances of the objects.

A mark 476 (black square) displayed on the side view 471 corresponds to the mark 474 (black square) displayed on the display image 403. Similarly, a mark 477 (black star) displayed on the side view 471 corresponds to the mark 475 (black star) displayed on the display image 403.

Each of the positions of the mark 476 (black square) and the mark 477 (black star) in the side view 471 is uniquely determined based on a position of the object in the up-down direction of the image capturing range and a distance between the camera 100 and the object. A distance to the object ("m" in FIG. 17) and an angle ("°" in FIG. 17) in the up-down direction in a direction where the object exists with respect to the camera 100, may be displayed in vicinities of the marks 476 and 477.

In FIG. 17, the focal plane 473 is adjusted to the mark 477 (black star). The user can therefore easily understand that the user can operate the focus lens to the FAR side in order to adjust the focal plane 473 to the mark 476 (black square).

As described above, a positional relationship between the focal plane 473 and the object may be displayed on the side view 471, and the focal plane 473 in the side view 471 may also be moved in conjunction with the operation of the focus lens. In this way, it is possible to suppress occurrence of a user's erroneous manual operation of the focus lens more appropriately.

The distance information of the object may also be calculated by a contrast AF method. The distance information may be converted from a driving position of the focus lens at which the highest contrast is acquired at the object position. Alternatively, distance information may directly be acquired through a technique, such as Light Detection and Ranging (LiDAR) using a distance sensor.

As described above, the information processing apparatus according to the present exemplary embodiment acquires a driving position of the image capturing element 12 relating to tilt driving, and judges whether a tilt angle exceeds a threshold based on the acquired driving position of the image capturing element 12. Based on the judgement result, the information processing apparatus executes display control for switching a display of a user interface (UI) for operating the focus lens and displaying the switched user interface on the display device 400. In a case where the tilt angle exceeds the threshold, the information processing apparatus may hide the user interface for operating the focus lens, or may also lock the user interface to make the user interface be inoperable. With this configuration, it is possible to prevent a user's erroneous manual operation of the focus lens.

Alternatively, in a case where the tilt angle exceeds the threshold, the information processing apparatus may switch the user interface for operating the focus lens to a user interface different from the user interface in a case where the tilt angle is less than or equal to the threshold, and may display the switched user interface.

For example, in the tilt image capturing state, the information processing apparatus may notify the user that a shift direction of the focal plane is changed in tandem with driving of the focus lens by displaying a user interface in which a display position and a shape of the focus bar is changed. In the tilt image capturing state, the information processing apparatus may also display a user interface in which the information (a character string, a picture, and a value/unit) indicating a shift direction of the focal plane shifted in tandem with driving of the focus lens is changed. Specifically, in the non-tilt image capturing state, the information processing apparatus displays a user interface which describes that a focal plane is shifted in a far-near direction, and in the tilt image capturing state, the information processing apparatus switches the user interface to another user interface which describes that the focal plane is shifted in an up-down direction. In this case, it is also possible to appropriately notify the user that a shift direction of the focal plane is changed in tandem with driving of the focus lens.

As described above, it is possible to appropriately suppress occurrence of a user's erroneous manual operation of the focus lens by displaying a different user interface for each of the non-tilt image capturing state and the tilt image capturing state.

Alternatively, the information processing apparatus according to the present exemplary embodiment may acquire information about a distance to the object, and may display at least any one of a position of the object in an image capturing range, a distance to the object, and a direction of the object, on the display device 400 based on the acquired distance information. At this time, the information processing apparatus may also display a side view of an image capturing range illustrating a positional relationship between the object and the focal plane on the display device 400. With this configuration, the user can visually figure out which way the user should operate the focus lens in order to shift the focal plane to a desired position.

As described above, it is possible to reduce occurrence of a user's erroneous operation of the focus lens because the user interface is switched and displayed for each of the non-tilt image capturing state and the tilt image capturing state, according to the present exemplary embodiment.

Other Exemplary Embodiments

The disclosure can be realized through the processing in which a program for realizing one or more functions according to the above-described exemplary embodiments is supplied to a system or an apparatus via a network or a storage medium, and one or more processors in the system or the apparatus read and execute the program. Alternatively, the disclosure can also be realized with a circuit (e.g., ASIC) that executes one or more functions.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-208053, filed Dec. 26, 2022, which is hereby incorporated by reference herein in its entirety.

What is claimed is:

1. An apparatus comprising:

at least one processor; and a memory coupled to the at least one processor storing instructions that, when executed by the at least one processor, cause the at least one processor to function as:

an acquisition unit configured to acquire a driving position of a capturing element which relates to tilt driving for changing a tilt angle formed between a surface of the capturing element and a main plane of an optical system by inclining the capturing element; and a determination unit configured to determine whether the tilt angle exceeds a threshold based on the acquired driving position of the capturing element and configured to determine a user interface for operating a focus lens of the optical system based on a determination result, wherein, in a case where the determination unit determines that the tilt angle is less than or equal to the threshold, the determination unit determines a first user interface for operating the focus lens as the user interface, and

wherein, in a case where the determination unit determines that the tilt angle exceeds the threshold, the determination unit determines a second user interface for operating the focus lens, different from the first user interface, as the user interface.

2. The apparatus according to claim 1, wherein, in a case where the determination unit determines that an angle formed between an optical axis of the optical system and a focal plane is less than a predetermined angle based on a driving position of the capturing element and a driving position of the focus lens, the determination unit determines that the tilt angle exceeds the threshold.

3. The apparatus according to claim 1, wherein, in a case where the determination unit determines that the tilt angle exceeds the threshold, the determination unit determines to switch a state of the user interface to a non-display state.

4. The apparatus according to claim 1, wherein, in a case where the determination unit determines that the tilt angle exceeds the threshold, the determination unit determines to make the user interface be locked and inoperable.

5. The apparatus according to claim 1,
wherein each of the first user interface and the second user interface includes information indicating a shift direction of a focal plane which is shifted in tandem with driving of the focus lens, and
wherein the first user interface and the second user interface are different in at least any one of a display position in a display unit, a shape of the user interface, and information indicating a shift direction of the focal plane.

6. The apparatus according to claim 5, wherein the first user interface includes, as the information indicating a shift direction of the focal plane, at least any one of a character string, a value, and a picture which express a perspective.

7. The apparatus according to claim 6, wherein the character string includes at least any one of "Near", "Far", "Front", "Back", "Front Side", "Back Side", "NEAR", and "FAR".

8. The apparatus according to claim 5, wherein the second user interface includes, as the information indicating a shift direction of the focal plane, at least any one of a character string, a value, and a picture which express at least any one of a height, a rotation direction, and an angle.

9. The apparatus according to claim 8, wherein the character string includes at least any one of "High", "Low", "Up", "Down", "Top", "Bottom", "UP", "DOWN", "LOW", "HIGH", "Clockwise", "Counterclockwise", "Forward", "Backward", "CW", and "CCW".

10. The apparatus according to claim 1,
wherein the first user interface is a user interface different from a user interface for operating the tilt angle, and
wherein the second user interface is a user interface integrated with the user interface for operating the tilt angle.

11. The apparatus according to claim 10, wherein, in the second user interface, a position of a user interface of the focus lens is changed in conjunction with an operation of the tilt angle executed on the user interface for operating the tilt angle.

12. A method comprising:
acquiring a driving position of a capturing element which relates to tilt driving for changing a tilt angle formed between an imaging surface of the capturing element and a main plane of an optical system by inclining the capturing element;

determining whether the tilt angle exceeds a threshold based on the acquired driving position of the capturing element; and
determining a user interface for operating a focus lens of the optical system based on a determination result,
wherein, in a case where the determining determines that the tilt angle is less than or equal to the threshold, the determining determines a first user interface for operating the focus lens as the user interface, and
wherein, in a case where the determining determines that the tilt angle exceeds the threshold, the determining determines a second user interface for operating the focus lens, different from the first user interface, as the user interface.

13. The method according to claim 12, further comprising acquiring distance information describing a distance to an object,
wherein, based on the acquired distance information, the determining determines the user interface which includes at least any one of a position of the object in a capturing range, a distance to the object, and a direction of the object.

14. The method according to claim 13, wherein the determining determines the user interface which includes a side view of a capturing range illustrating a positional relationship between the object and a focal plane.

15. The method according to claim 12, wherein, in a case where the determining determines that an angle formed between an optical axis of the optical system and a focal plane is less than a predetermined angle based on a driving position of the capturing element and a driving position of the focus lens, the determining determines that the tilt angle exceeds the threshold.

16. A non-transitory computer-readable storage medium storing a program for executing a method, the method comprising:
acquiring a driving position of a capturing element which relates to tilt driving for changing a tilt angle formed between an imaging surface of the capturing element and a main plane of an optical system by inclining the capturing element;
determining whether the tilt angle exceeds a threshold based on the acquired driving position of the capturing element; and
determining a user interface for operating a focus lens of the optical system based on a determination result,
wherein, in a case where the determining determines that the tilt angle is less than or equal to the threshold, the determining determines a first user interface for operating the focus lens as the user interface, and
wherein, in a case where the determining determines that the tilt angle exceeds the threshold, the determining determines a second user interface for operating the focus lens, different from the first user interface, as the user interface.

17. The non-transitory computer-readable storage medium according to claim 16, further comprising acquiring distance information describing a distance to an object,
wherein, based on the acquired distance information, the determining determines the user interface which includes at least any one of a position of the object in a capturing range, a distance to the object, and a direction of the object.

18. The non-transitory computer-readable storage medium according to claim 17, wherein the determining determines the user interface which includes a side view of a capturing range illustrating a positional relationship between the object and a focal plane.

19. The non-transitory computer-readable storage medium according to claim 16, wherein, in a case where the determining determines that an angle formed between an optical axis of the optical system and a focal plane is less than a predetermined angle based on a driving position of the capturing element and a driving position of the focus lens, the determining determines that the tilt angle exceeds the threshold.

* * * * *